(12) United States Patent
Shinotsuka

(10) Patent No.: US 11,940,534 B2
(45) Date of Patent: Mar. 26, 2024

(54) DETECTION DEVICE AND DETECTION UNIT

(71) Applicant: Michiaki Shinotsuka, Kanagawa (JP)

(72) Inventor: Michiaki Shinotsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 393 days.

(21) Appl. No.: 17/448,395

(22) Filed: Sep. 22, 2021

(65) Prior Publication Data

US 2022/0099832 A1     Mar. 31, 2022

(30) Foreign Application Priority Data

Sep. 25, 2020    (JP) ................................ 2020-160574
Aug. 24, 2021    (JP) ................................ 2021-136080

(51) Int. Cl.
| | |
|---|---|
| *G01S 17/04* | (2020.01) |
| *A01M 1/02* | (2006.01) |
| *A01M 1/04* | (2006.01) |
| *A01M 31/00* | (2006.01) |
| *G01S 7/481* | (2006.01) |

(52) U.S. Cl.
CPC ............ *G01S 17/04* (2020.01); *G01S 7/4813* (2013.01); *G01S 7/4815* (2013.01); *A01M 1/026* (2013.01); *A01M 1/04* (2013.01); *A01M 31/002* (2013.01)

(58) Field of Classification Search
CPC ...... G01S 17/04; G01S 7/4813; G01S 7/4815; A01M 31/002
See application file for complete search history.

(56) References Cited

U.S. PATENT DOCUMENTS

| | | | |
|---|---|---|---|
| 2013/0028589 A1* | 1/2013 | Zung ................. | H01L 27/14683 396/529 |
| 2021/0131954 A1* | 5/2021 | Shinotsuka ............. | G01J 5/025 |
| 2021/0293955 A1* | 9/2021 | Shinotsuka ........... | G01S 7/4815 |

FOREIGN PATENT DOCUMENTS

| | | | |
|---|---|---|---|
| CN | 209560247 U | * | 10/2019 |
| CN | 210605706 U | * | 5/2020 |
| JP | 2019-180325 | | 10/2019 |
| JP | 2020-071153 | | 5/2020 |
| JP | 2021-071474 | | 5/2021 |

* cited by examiner

*Primary Examiner* — David P Porta
*Assistant Examiner* — Casey Bryant
(74) *Attorney, Agent, or Firm* — IPUSA, PLLC

(57) ABSTRACT

A detection device includes a first light source configured to emit a first light in a first direction, and a second light source configured to emit a second light in a second direction different from the first direction. A light receiver is configured to receive one of a first reflected light of the first light and a second reflected light of the second light. A black shielding plate surrounds a light source substrate including the first light source, the second light source, and the light receiver. An outer housing surrounds the black shielding plate. A transparent member is configured to pass the first light and the second light to outside of the outer housing.

12 Claims, 22 Drawing Sheets

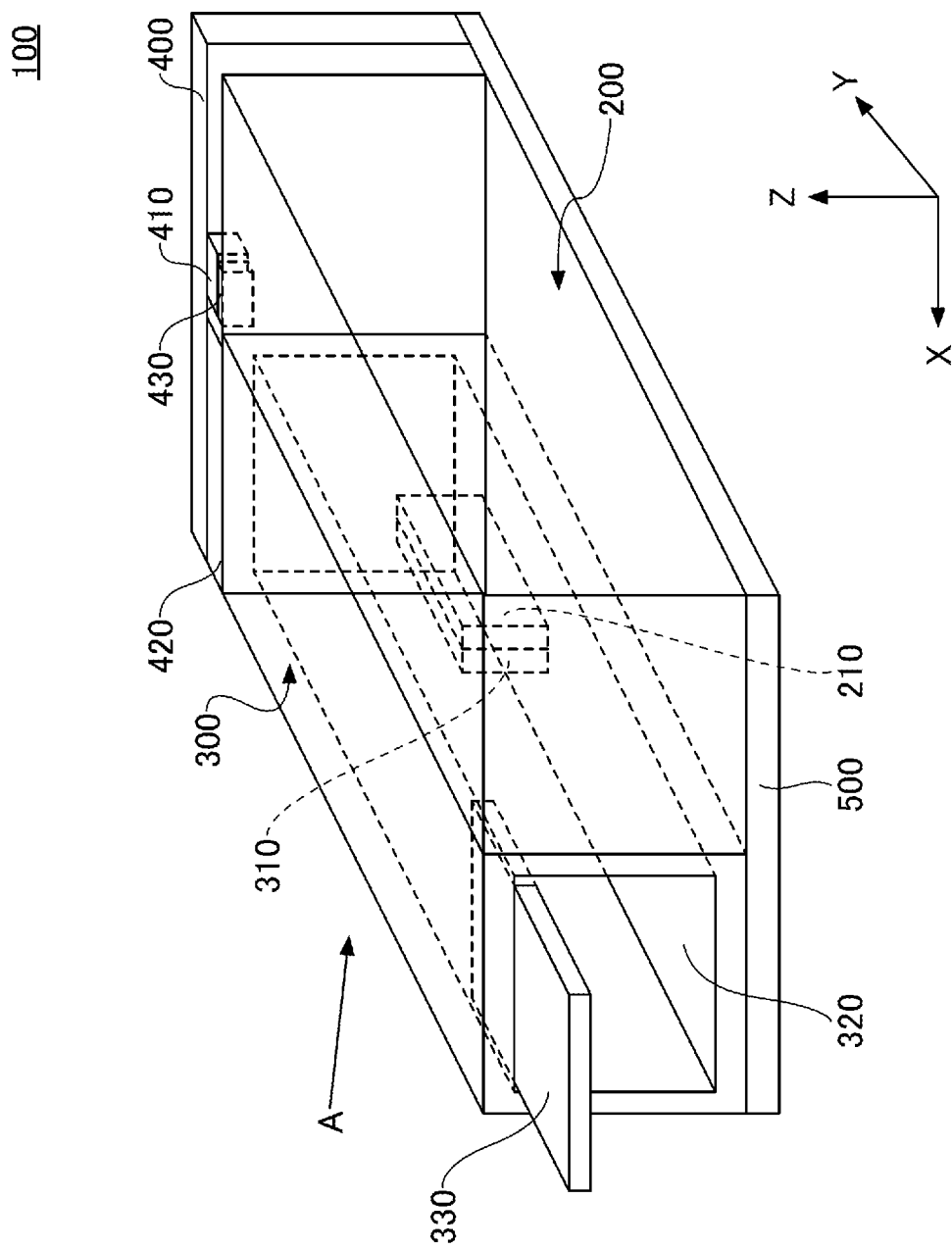

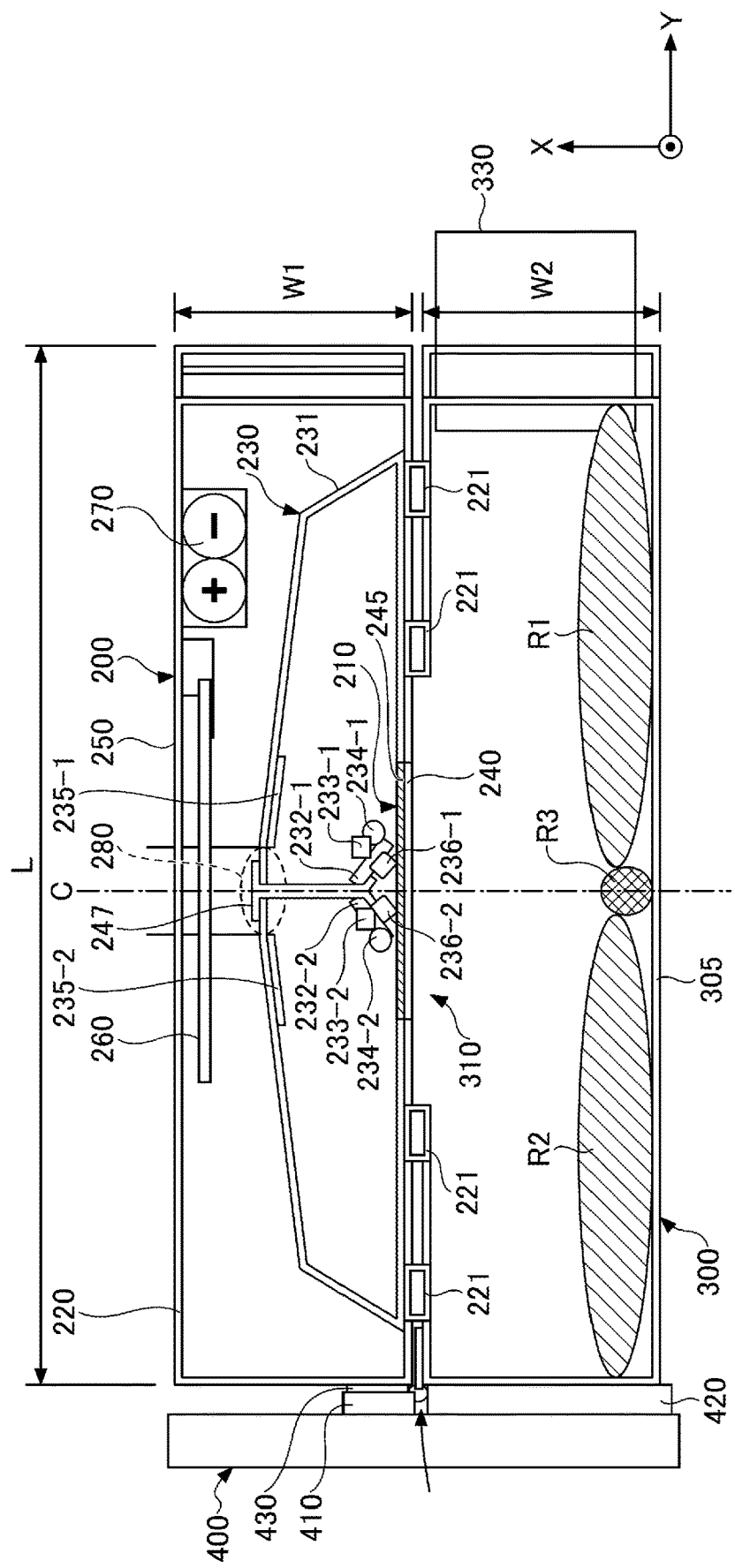

FIG.10

| DETECTION OBJECT | OUTPUT LEVEL (V) | ~631 |
|---|---|---|
| SMALL INSECT | 0.1 ~ 0.5 | |
| ADULT INSECT | 0.6 ~ 1.9 | |
| HARMFUL ANIMAL | 2 ~ 5 | |

FIG.19

| DETECTION DEVICE | PRESENCE AND ABSENCE OF DETECTION | DEVICE POSITION | DETECTION DATE AND TIME |
|---|---|---|---|
| 200a1 | ABSENT | 1F - SOUTH | - |
| 200a2 | PRESENT | 1F - NORTH | 2018/06/11-22:35 |
| ... | ... | ... | ... |
| 200ai | ABSENT | 1F - EAST | - |
| 200b1 | PRESENT | 2F - SOUTH | 2018/06/12-3:29 |
| 200b2 | ABSENT | 2F - NORTH | - |
| ... | ... | ... | ... |
| 200bj | ABSENT | 2F - WEST | - |
| 200c1 | PRESENT | 3F - SOUTH 1 | 2018/06/13-19:02 |
| 200c2 | PRESENT | 3F - SOUTH 2 | 2018/06/13-20:07 |
| 200c3 | PRESENT | 3F - SOUTH 3 | 2018/06/13-19:30 |
| 200c4 | ABSENT | 3F - NORTH | - |
| ... | ... | ... | ... |
| 200ck | ABSENT | 3F - EAST | - |
| 200d1 | ABSENT | 4F - SOUTH | - |
| 200d2 | ABSENT | 4F - NORTH | - |
| ... | ... | ... | ... |
| 200dm | ABSENT | 4F - WEST | - |

DETECTION DEVICE AND DETECTION UNIT

CROSS-REFERENCE TO RELATED APPLICATION

The present application is based on and claims priority to Japanese Patent Application No. 2020-160574 filed on Sep. 25, 2020, and Japanese Patent Application No. 2021-136080 filed on Aug. 24, 2021, the entire contents of which are hereby incorporated herein by reference.

BACKGROUND OF THE INVENTION

1. Field of the Invention

The present invention relates to a detection device and a detection unit.

2. Description of the Related Art

Conventionally, a detection device for detecting an object based on reflected light of light emitted from a light source is known, as described in Japanese unexamined patent publication No. 2019-180325. As an example of such a detection device, for example, a harmful animal automatic capturing device that releases a trigger for opening and closing a box trap based on a detected output signal of a reflective photosensor having a light emitting unit and a light receiver is known.

In the related art device described above, a reflective photosensor is disposed facing downward, and light emitted from the light source is emitted downwardly. Thus, in a conventional apparatus, an object can be detected in a region below the light source, but in a region other than the region below the light source, it is difficult to detect the object.

SUMMARY OF THE INVENTION

Accordingly, embodiments of the disclosed technique are intended to expand a region to be irradiated with light.

More specifically, the embodiments of the present disclosure may provide a detection device including a first light source configured to emit a first light in a first direction, and a second light source configured to emit a second light in a second direction different from the first direction. A light receiver is configured to receive one of a first reflected light of the first light and a second reflected light of the second light. A black shielding plate surrounds a light source substrate including the first light source, the second light source, and the light receiver. An outer housing surrounds the black shielding plate. A transparent member is configured to pass the first light and the second light to outside of the outer housing.

Other objects, features and advantages of the present invention will become more apparent from the following detailed description when read in conjunction with the accompanying drawings.

BRIEF DESCRIPTION OF THE DRAWINGS

FIG. 1 is a diagram illustrating an appearance of a detection unit according to a first embodiment;

FIG. 2A is a perspective diagram of a detection unit when viewed from a top surface;

FIG. 10 is a diagram illustrating an example of a determination table according to the first embodiment;

FIG. 19 is a first diagram illustrating an example of aggregated data according to the fourth embodiment;

DETAILED DESCRIPTION OF THE PREFERRED EMBODIMENTS

First Embodiment

Figure 2B:
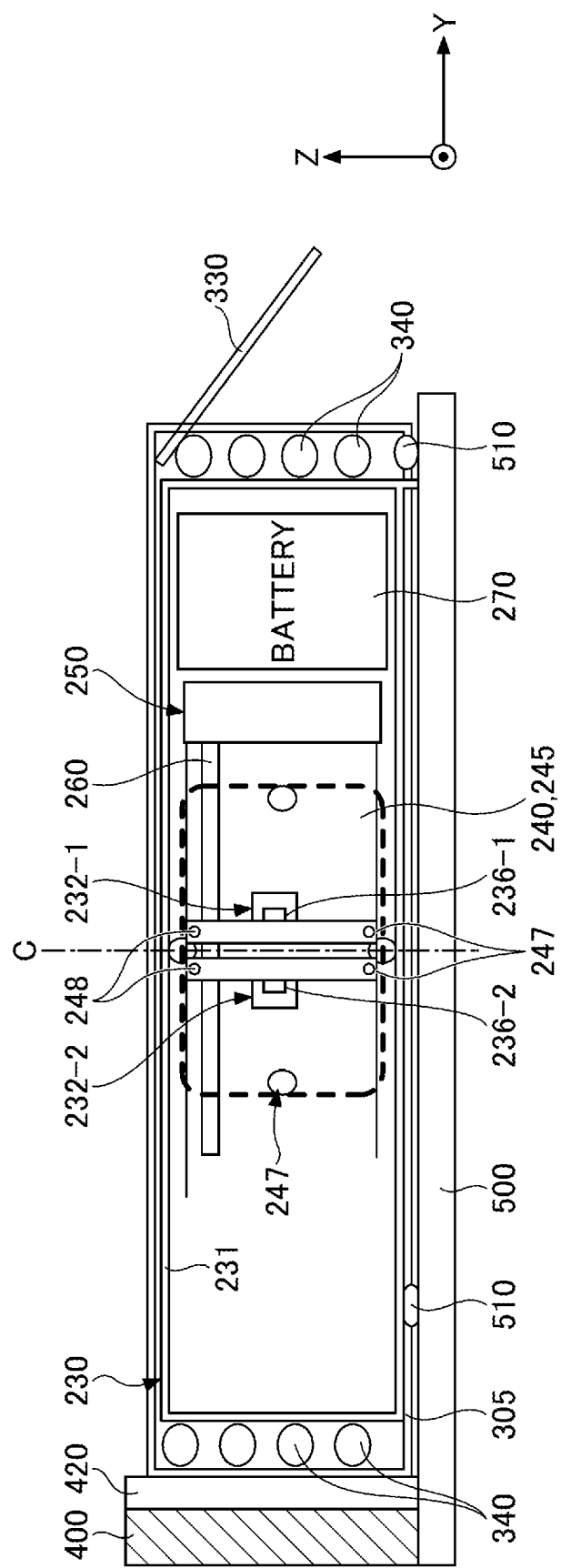
FIG. 2B is a perspective diagram of a detection unit when viewed in a direction of arrow A in FIG. 1.

A first embodiment will be described with reference to the drawings. FIG. 1 is a diagram illustrating an appearance of a detection unit according to the first embodiment. In the following description, for convenience, a Z-axis direction in the drawing is set to an upward-downward direction; a Y-axis direction in the drawing is set to a forward-backward direction, and an X-axis direction in the drawing is set to a right-left direction.

A detection unit 100 of the present embodiment includes a detection device 200, a detection box 300, securing members 400 and 410, and vibration absorbing members 420 and 500.

The detection device 200 includes a light source therein and detects an object that has entered the detection box 300. The object of the present embodiment may be, for example, a harmful animal, a harmful insect, and the like. The detection box 300 is provided to capture an object.

The securing members 400 and 410 are provided to secure the detection device 200 and the detection box 300, and may be, for example, made of a metal plate and the like. Vibration absorbing members 420 and 500 are provided to absorb vibrations of the detection box 300 when an object enters the detection box 300, and may be, for example, made of a sponge and the like.

The detection device 200 and the detection box 300 according to the present embodiment include windows 210 and 310, respectively.

The detection device 200 and the detection box 300 are arranged side-by-side and secured by the securing member 400. On this occasion, the detection device 200 and the detection box 300 are fixed so that the face on which the window 210 is formed faces the face on which the window 310 is formed. Further, the detection device 200 and the detection box 300 are fixed so that light emitted from a light source within the detection device 200 passes through the window 210 (the first window) and the window 310 (the second window) and reaches the inside of the detection box 300.

In an example of FIG. 1, the detection box 300 is disposed in the left direction of the detection device 200, but both arrangements are not limited thereto. The detection box 300 may be disposed on the right side of the detection device 200. The object may be, for example, a harmful insect pest, a harmful animal and the like in the present embodiment.

The detection device 200 of the present embodiment includes a plurality of light sources that emit light having different wavelengths, and detects an object that enters the detection box 300 based on the reflected light of the light emitted from the light source. Details of the detection device 200 are described below.

The detection box 300 has an opening 320 and a lid 330, and when an object enters the detection box 300, the lid 330 mechanically closes the opening 320 and traps the object.

Figure 3:
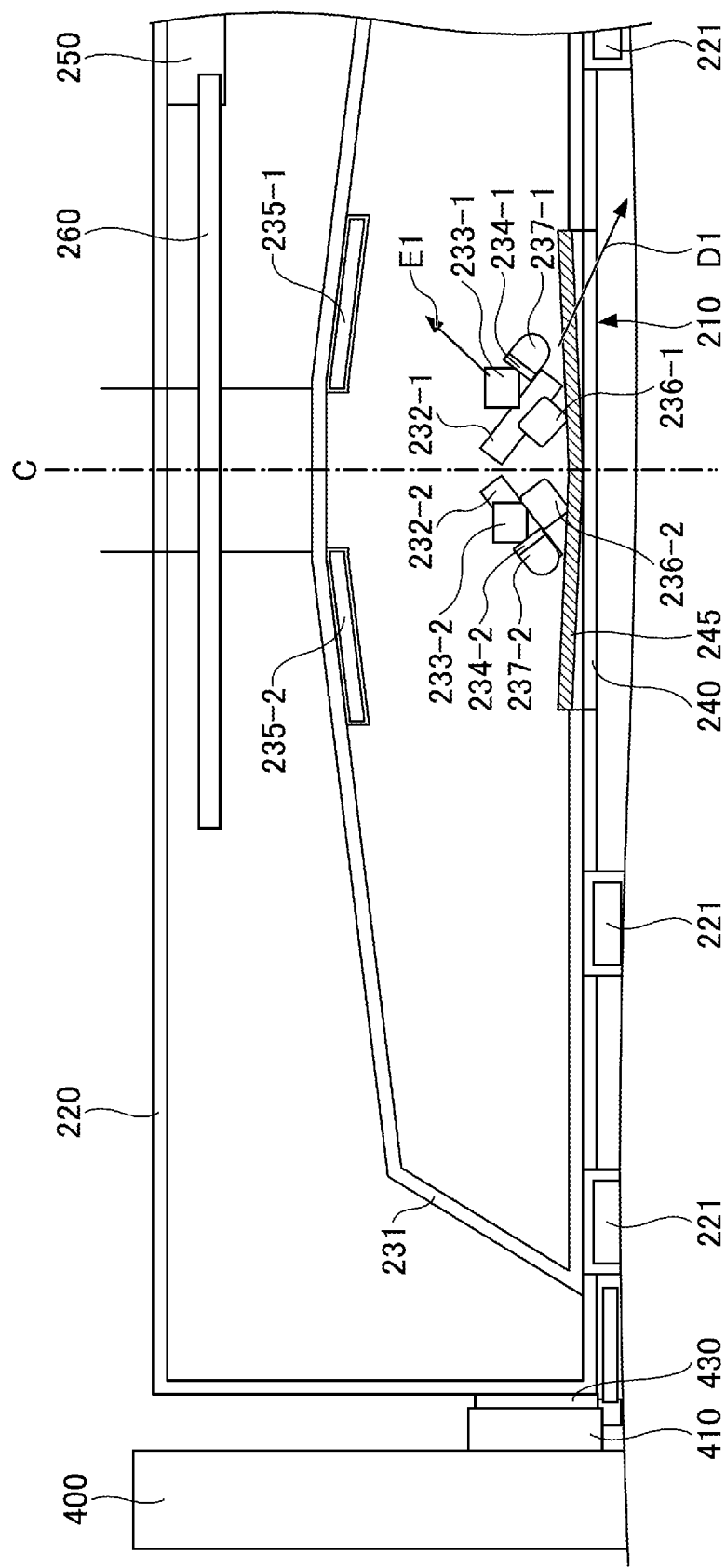
FIG. 3 is an enlarged view of a periphery of a window of a detection device.

Next, a detection device 200 according to the present embodiment will be described with reference to FIGS. 2A and 2B. FIG. 2A is a perspective diagram when a detection unit 100 is viewed from a top surface, and FIG. 2B is a perspective diagram when a detection unit 100 is viewed in a direction of an arrow A in FIG. 1. FIG. 3 is an enlarged view of a periphery of a window of a detection device illustrated in FIG. 2.

The detection device 200 in the present embodiment has an outer housing 220 in which a window 210 is formed on a face facing the detection box 300. The outer housing 220 may be secured to the securing member 410 and the detection box 300, for example, through the securing member 430. The securing member 430 may be, for example, a hinge and the like. The securing member 410 secures the detection device 200 to the securing member 400. The securing members 400 and 410 are made of, for example, metal plates and the like.

A transparent substrate 240 is fitted in the window 210 formed in the outer housing 220, and is secured to the window 210 in any manner. Further, in the present embodiment, a transparent film 245 is disposed on the transparent substrate 240. In other words, the window 210 is covered with the transparent substrate 240 and the transparent film 245.

That is, the window 210 of the present embodiment is covered with the transparent substrate 240, which is a transparent member, and the transparent film 245, which is another transparent member.

The transparent substrate 240 in the present embodiment may be implemented, for example, by a rigid vinyl chloride and the like having a light refractive index of 1.53 and a light transmittance of about 80%. The transparent film 245 may be implemented by vinyl chloride having a light refractive index of 1.66 and a light transmittance of about 85%.

The light refractive index and the light transmittance of the transparent substrate 240 and the transparent film 245 are not limited to the values described above, and the light refractive index of the transparent film 245 may be higher than the light refractive index of the transparent substrate 240. In other words, in the detection device 200 of the present embodiment, the optical refractive index of another transparent member disposed on the transparent member (on the light source side) is greater than the optical refractive index of the transparent member.

Also, in the present embodiment, when the transparent substrate 240 is disposed parallel to the XY plane (horizontal plane), the transparent film 245 is disposed so that the transparent film 245 has an angle to the XY plane. Details of the arrangement of the transparent substrate 240 and the transparent film 245 will be described below.

In the detection device 200, the outer housing 220 includes a detection unit 230, a control substrate 250, a communication module 260, and a power source 270 therein. A vibration absorbing member 221 may be disposed between the outer housing 220 and the detection box 300.

The detection unit 230 detects an object that has entered the detection box 300. The control substrate 250 is implemented with a control circuit that controls the operation of the detection unit 230. Details of the control substrate 250 are described below.

The communication module 260 includes an antenna for communication between the detection device 200 and an external device. Specifically, the communication module 260 is an example of a transmitter that transmits, to an external device, a notification indicating that the detection unit 230 detects an object.

The power source 270 is provided to supply power to the detection unit 230 and the control substrate 250. Specifically, the power source 270 may be a conventional battery, a dry cell and the like.

The detection unit 230 of the present embodiment includes a black shielding plate 231, light source substrates 232-1 and 232-2, light emitting diodes (LED) 233-1 and 233-2, infrared light sources 234-1 and 234-2, reflective plates 235-1 and 235-2, and light receivers 236-1 and 236-2.

In the following description, when each of the light source substrates 232-1 and 232-2, LEDs 233-1 and 233-2, infrared light sources 234-1 and 234-2, reflective plates 235-1 and 235-2, light receivers 236-1 and 236-2 is not distinguished, they are expressed as a light source substrate 232, an LED 233, an infrared light source 234, a reflective plate 235, and a light receiver 236.

In the following description, the structure including the light source substrate 232, the LED 233, the infrared light source 234, the reflective plate 235, and the light receiver 236 may be referred to as an optical system.

The black shielding plate 231 is disposed to cover the optical system. In other words, the optical system is surrounded by the black shielding plate 231, the transparent substrate 240 and the transparent film 245 such that the transparent substrate 240 and the light source substrate 232 are adjacent to each other in the right-left direction.

Also, the black shielding plate 231 of the present embodiment may be formed, for example, into a shape that has a protrusion in the central portion 280 at a longitudinal length L in the front-back direction of the outer housing 220 and that has slopes inclined downward from the central portion forward and backward. The central portion 280 is a portion including a center line C equally dividing the length L into two.

Each of the light source substrates 232-1 and 232-2 may be secured in any manner to the black shielding plate 231 so as to be positioned over the transparent film 245. That is, the transparent film 245 is disposed between the transparent substrate 240 and the light source substrate 232.

The light source substrate 232-1 (the first light source substrate) and the light source substrate 232-2 (the second light source substrate) have LEDs 233-1 and 233-2, infrared light sources 234-1 and 234-2, and light receivers 236-1 and 236-2, respectively.

More specifically, in the present embodiment, the LEDs 233-1 and 233-2 and the infrared light sources 234-1 and 234-2 are provided on the top face (surface) of the light source substrates 232-1 and 232-2, respectively, and the light receiver 236-1 and 236-2 are provided on the bottom face of the light source substrates 232-1 and 232-2, respectively.

Each of the light source substrates 232-1 and 232-2 is secured on the transparent substrate 240 such that the surface is inclined downward in a front-back direction from the central portion 280 in the longitudinal length L of the outer housing 220.

Specifically, each of the light source substrates 232-1 and 232-2 is secured to the black shielding plate 231 with a fixture 247. The fixture 247 may be secured to the black shielding plate 231 by screws 248, as illustrated in FIG. 2B. A securing method is not limited to securing with screws 248. The fixture 247 may be secured to the black shielding plate 231, for example, by a double-sided tape and the like. Each of the light source substrates 232-1 and 232-2 is connected to the control substrate 250 via a cable and a connector.

A top face of the light source substrate 232 is a face on which the LED 233 and the infrared light source 234 are mounted. A bottom face of the light source substrate 232 is the opposite face of the top face and is a face on which the light receiver 236 is mounted.

In the present embodiment, an infrared absorbing member may be provided between the light source substrate 232-1 and the light source substrate 232-2. By providing the infrared absorbing member, the occurrence of false detection can be inhibited such that the light receiver 236 provided in the other light source substrate 232 detects infrared light emitted from the infrared light source 234 provided in one of the light source substrates 232.

The LEDs 233-1 and 233-2 emit visible light in a direction perpendicular to the top face of the light source substrate 232-1 and 232-2. In FIG. 2A, a region to be irradiated with visible light is denoted as a region R3. The wavelength range of visible light emitted from the LED 233 in the present embodiment is, for example, about 500 nm to about 600 nm. The LED 233 according to the present embodiment is an example of a third light source or another light source, and visible light is an example of a third light or another light.

The inside of the detection box 300 is irradiated with the visible light that is light emitted from the LED 233-1 and then reflected from the reflective plate 235-1 through the window 210 covered with the transparent substrate 240.

The infrared light sources 234-1 and 234-2 include prisms 237-1 and 237-2, respectively, in the direction in which infrared light is emitted. Specifically, the infrared light source 234-1 includes the prism 237-1 on the front side (Y-axis positive side) in the front-back direction of the detection device 200, and the infrared light source 234-2 includes the prism 237-2 on the rear side (Y-axis negative side) in the front-back direction of the detection device 200.

In the present embodiment, infrared light is diffused radially by providing the prism 237 in the infrared light source 234. Thus, in the present embodiment, the infrared light passing through the windows 210 and 310 is emitted over a wide range within the detection box 300 by radially diffusing the infrared light.

In FIG. 2A, the region in which the object can be detected by infrared light emitted from the infrared light source 234-1 is denoted as a region R1, and the region in which the object can be detected by infrared light emitted from the infrared light source 234-2 is denoted as a region R2. In the following description, a region in which detection of an object is possible by at least one of visible light and infrared light may be referred to as a detectable region. Therefore, each of the regions R1, R2 and R3 is a detectable region.

The infrared light source 234 according to the present embodiment is an example of a light source, and the infrared light is an example of light. The infrared light source 234-1 is an example of a first light source, and the infrared light emitted from the infrared light source 234-1 is an example of a first light. The infrared light source 234-2 is an example of a second light source, and the infrared light emitted from the infrared light source 234-2 is an example of a second light.

The infrared light that does not pass through the window 210 is absorbed by the black shielding plate 231. In the present embodiment, the light receiver 236 is provided on the face opposite to the face on which the infrared light source 234 is disposed in the light source substrate 232. Therefore, in the present embodiment, the infrared light that does not pass through the window 210 is not detected by the light receiver 236, and thus false detection can be prevented. Details of the placement of the LED 233 and the infrared light source 234 on the light source substrate 232 are described below.

The wavelength range of the infrared light emitted from the infrared light source 234 in the present embodiment is about 800 nm to about 1150 nm.

The reflective plates 235-1 and 235-2 are secured inside the black shielding plate 231 in any manner by a screw, a double-sided tape and the like. The reflective plates 235-1 and 235-2 are mounted at a position facing the top face of the light source substrate 232, and reflect visible light emitted from the LEDs 233-1 and 233-2 in a direction perpendicular to the light source substrates 232-1 and 232-2.

The reflective plate 235-1 and the reflective plate 235-2 of the present embodiment may be of a material and a color corresponding to the visible light.

Also, the reflective index of the reflective plate 235 to the visible light is at least greater than the reflective index of the inner face of the black shielding plate 231 to the visible light. The reflective plate 235 may be detachable from the black shielding plate 231. In this case, the reflective index of the reflective plate 235 can be repeatedly changed by changing the material and the color used for the reflective plate 235. An installation position, an installation angle, and a reflective index of the reflective plate 235 is appropriately set so that the visible light from the reflective plate 235 is emitted to the inside of the detection box 300.

The light receiver 236-1 and 236-2 are provided on the bottom face of the light source substrates 232-1 and 232-2, respectively, and receive reflected light transmitted through the transparent substrate 240 and through the window 210. The light receivers 236-1 and 236-2 detect the object by receiving the reflected light of the infrared light from the object to which the infrared light is emitted and receiving the reflected light of the infrared light from the object to which the visible light is emitted. The light receiver 236 according to the present embodiment may be implemented by an infrared light sensor such as an infrared photodiode and an infrared light phototransistor.

Thus, the detection device 200 of the present embodiment includes a plurality of light source substrates 232 having a plurality of light sources 233 and 234 that emit light of different wavelengths in different directions. The detection device 200 in the present embodiment includes the black shielding plate 231 covering the plurality of light source substrates 232, the transparent member (transparent substrate 240), and another transparent member (transparent film 245) disposed between the light source substrate 232 and the transparent member 240.

In the present embodiment, an example in which the control substrate 250 and the light source substrate 232 are separated is described. However, the control substrate 250 and the light source substrate 232 may be formed as an integrated substrate. In this case, the light source substrate 232 may be a region protruding from the control substrate 250. In this case, when the control substrate 250 is disposed parallel to the XY plane, the light source substrate 232 is formed to be inclined downward (in the negative direction of the Z-axis) with respect to the XY plane.

The detection box 300 of the present embodiment includes an outer housing 305 and light introducing holes 340. The light introducing holes 340 may be formed in the outer housing 305 on a face opposite to the face in which the window 310 is formed. The light introducing holes 340 are not necessarily provided.

A vibration absorbing member 420 is disposed between the detection box 300 and the securing member 400. A vibration absorbing member 510 is disposed between the detection box 300 and a vibration absorbing member 500.

Note that in the detection unit 100, the vibration absorbing members 420, 500, and 510 are not required, and the detection unit 100 may not include the vibration absorbing members 420, 500, and 510.

In the present embodiment, because the control substrate 250 and the light source substrate 232 are separately provided, the accuracy of detection can be improved without light interference. Further, by placing the control substrate 250 at a position other than the light source substrate 232, it is possible to prevent an interconnection from disturbing the optical system.

Further, the detection unit 100 according to the present embodiment can prevent the impact caused by the object from directly transmitting to the detection device 200 by providing the vibration absorbing members 420, 500, and 510, a cushion and the like. Further, because the detection unit 100 is unlikely to make a loud noise or vibration, the detection unit 100 can be installed without being noticed. Furthermore, because vibration is not easily generated in the detection unit 100 according to the present embodiment, the optical system can be stabilized; the detection accuracy of the entry of the object can be improved, and the frequency of malfunctions can be reduced.

Next, the arrangement of the LED 233, the infrared light source 234, and the prism 237 in the light source substrate 232 will be described with reference to FIG. 4.

Figure 4:
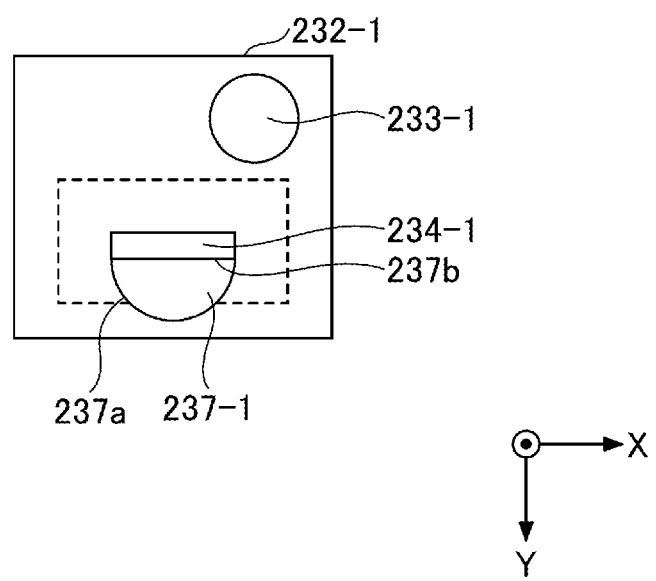
FIG. 4 is a diagram for explaining a light source substrate.

FIG. 4 is a diagram illustrating a light source substrate. In an example of FIG. 4, a light source substrate 232-1 will be described as an example. In a light source substrate 232-2, the forward direction in the light source substrate 232-1 becomes the backward direction.

In the light source substrate 232-1 of the present embodiment, an LED 233-1, an infrared light source 234-1, and a prism 237-1 are disposed.

The prism 237-1 is provided in the forward direction (Y-axis positive direction) of the LED 233-1. The prism 237 has a semi-cylindrical front face 237a and a back face 237b projecting forward (Y-axis positive) of the infrared light source 234. The prism 237 transmits from a front face 237a infrared light incident from the back face 237b in the forward direction (in the Y-axis positive direction, in a direction of an arrow D1 illustrated in FIG. 3) while diffusing the infrared light so as to radially spread in a right-left direction (in the X-axis direction).

The LED 233-1 in the present embodiment emits visible light in a direction perpendicular to the top face of the light source substrate 232-1 (the arrow E1 direction illustrated in FIG. 3).

The light source substrate 232-1 according to the present embodiment has an inclination angle of about 15 degrees with respect to the XY plane (horizontal plane) and slants downwardly forward and backward.

Due to this, the infrared light emitted from the prism 237 and the emitted direction have an inclination angle of about 15 degrees with respect to the XY plane (horizontal plane) and slants downward and forward. The emitted direction of the visible light emitted from the LED 233 has an inclination angle of about 15 degrees with respect to the XZ plane (vertical plane) and slants forward (Y-axis positive direction).

Figure 5A:
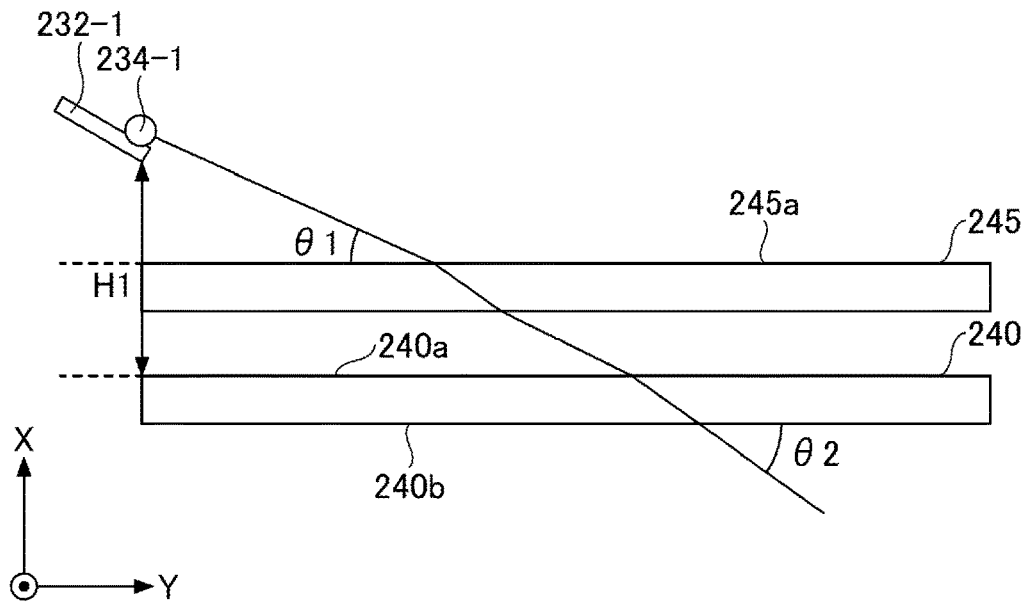
FIGS. 5A and 5B are diagrams illustrating an arrangement of a transparent substrate and a transparent film.
Figure 5B:
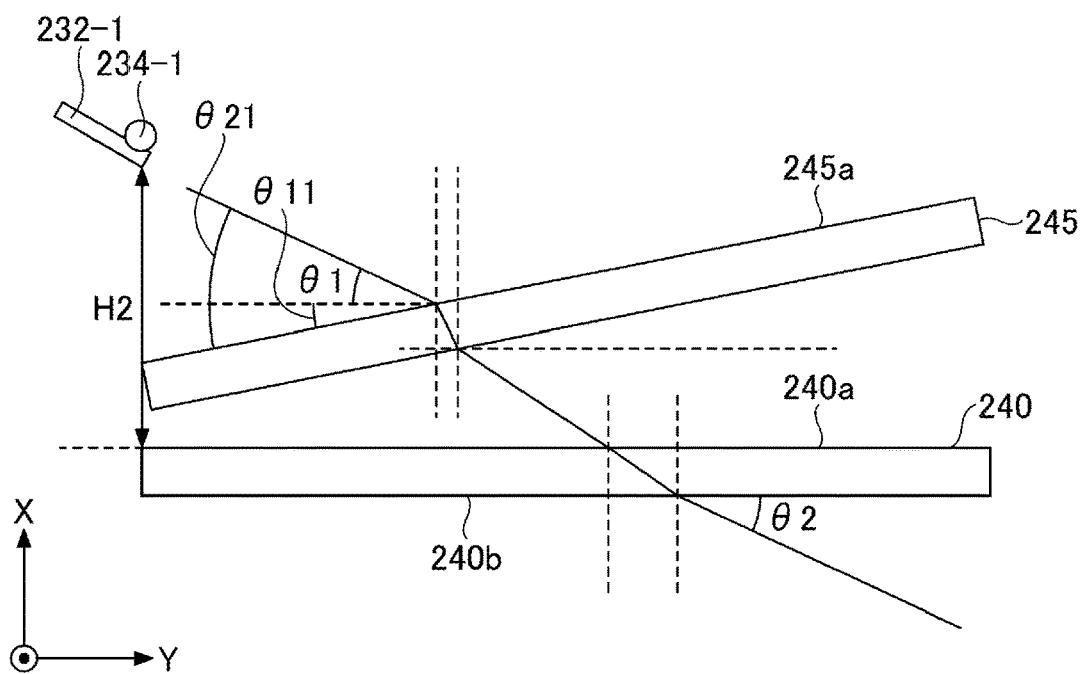

Next, an arrangement of the transparent substrate 240 and the transparent film 245 will be described with reference to FIGS. 5A and 5B. FIGS. 5A and 5B are diagrams illustrating an arrangement of a transparent substrate and a transparent film. FIG. 5A is a diagram illustrating a case in which a transparent substrate 240 and a transparent film 245 are disposed in parallel, and FIG. 5B is a diagram illustrating a case in which a transparent film 245 is disposed in an inclined manner with respect to a transparent substrate 240.

Each of FIGS. 5A and 5B illustrates a relationship between a light source substrate 232-1 and a transparent substrate 240, and a transparent film 245 as an example. In the examples of FIGS. 5A and 5B, the optical refractive index of the transparent substrate 240 is set to 1.53, and the optical refractive index of the transparent film 245 is set to 1.66.

As illustrated in FIG. 5A, when the transparent substrate 240 and the transparent film 245 are arranged in parallel to the XY plane, infrared light emitted from the infrared light sources 234-1 enters the transparent film 245 having a high optical refractive index and then enters the transparent substrate 240 having a low optical refractive index.

Thus, in the example of FIG. 5A, an angle $\theta 1$ is equal to an angle $\theta 2$. Note that the angle $\theta 1$ is an angle of infrared light with respect to a top face 245a of the transparent film 245 when infrared light enters the transparent film 245, and is an elevation angle with respect to the top face 245a of the transparent film 245. The angle $\theta 2$ is an angle of infrared light emitted from the transparent substrate 240 with respect to the bottom face 240b of the transparent substrate 240 and is a depression angle with respect to the bottom face 240b of the transparent substrate 240.

In the present embodiment, the depression angle with respect to the bottom face 240b of the transparent substrate 240 is an emission angle from the detection device 200 to the inside of the detection box 300.

Note that the top face 240a of the transparent substrate 240 is a face facing the bottom face 245b of the transparent film 245, and the bottom face 240b of the transparent substrate 240 is a face opposite to the top face 240a and is a face facing the detection box 300 (see FIG. 2A). The top face 245a of the transparent film 245 is a face facing the bottom face of the light source substrate 232 (see FIG. 2A). The bottom face 245b of the transparent film 245 is a face facing the top face 240a of the transparent substrate 240 and the opposite face of the top face 245a.

In contrast, in the embodiment illustrated in FIG. 5B, the transparent film 245 is tilted with respect to the transparent substrate 240 such that the transparent film 245 is away from the transparent substrate 240. In other words, in the example of FIG. 5B, the transparent film 245 is inclined at an angle θ11 so as to rise forward (Y-axis forward) from the central portion 280. The forward direction (Y-axis positive direction) is, for example, the direction of travel of the infrared light emitted from the infrared light source 234-1.

In this case, the angle of infrared light θ21 with respect to the top face 245a of the transparent film 245 becomes the sum of the elevation angle θ1 and the inclination angle θ11 of the transparent film 245, and becomes greater than the elevation angle θ1.

Then, the depression angle θ2 in FIG. 5B is smaller than the depression angle θ2 in FIG. 5A.

In the present embodiment, the smaller the depression angle θ2 with respect to the bottom face 240b of the transparent substrate 240, the larger the range to be irradiated with infrared light. That is, in the detection box 300, the area capable of detecting the object is expanded.

In the present embodiment, as illustrated in FIG. 5B, by slanting the transparent film 245, the distance between the light source substrate 232-1 and the transparent substrate 240 can be increased. Specifically, the distance H2 between the top face 240a of the transparent substrate 240 and the light source substrate 232-1 illustrated in FIG. 5B can be made longer than the distance H1 between the top face 240a of the transparent substrate 240 and the light source substrate 232-1 illustrated in FIG. 5A.

In the present embodiment, by increasing the distance between the infrared light source 234 and the transparent substrate 240 in this manner, destruction of the infrared light source 234 on the light source substrate 232 caused by vibrations of the detection box 300 can be reduced.

In the present embodiment, with respect to the light source substrate 232-2, the transparent film 245 is also tilted with respect to the transparent substrate 240 such that the transparent film 245 is further away from the transparent substrate 240. In other words, the transparent film 245 is tilted upward from the central portion 280 toward the rear (Y-negative) direction.

Figure 6:
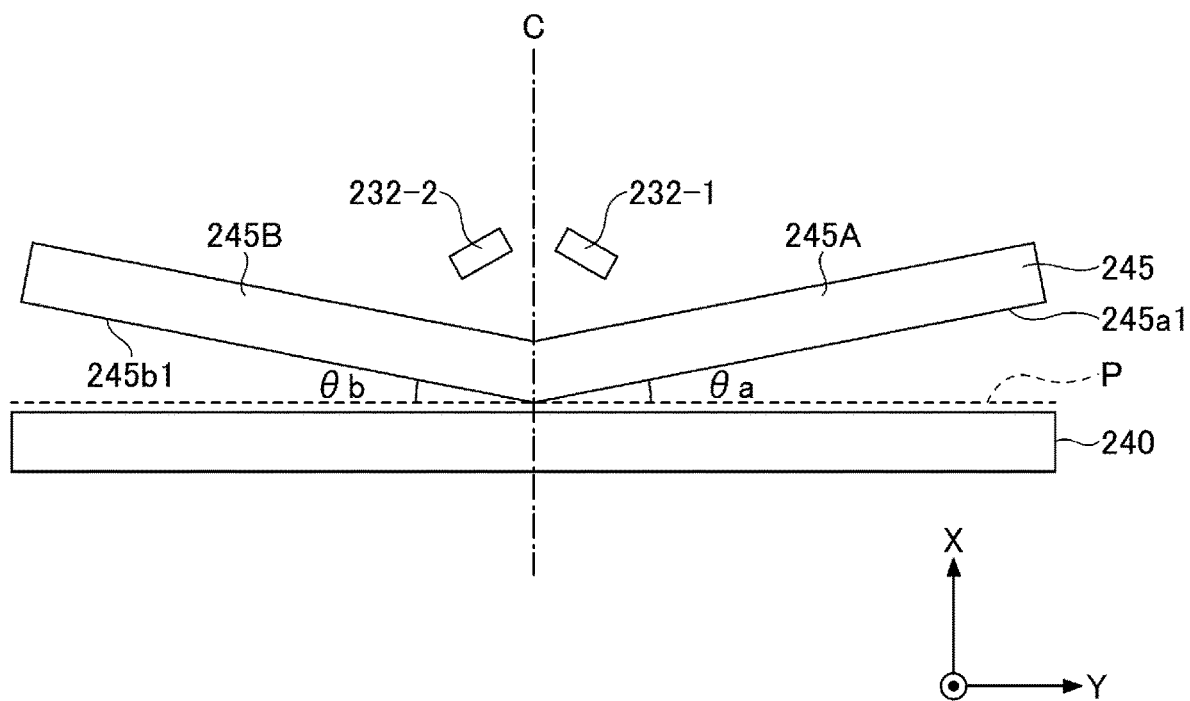
FIG. 6 is a diagram illustrating a shape of a transparent film.

Accordingly, in the present embodiment, the transparent film 245 is shaped as illustrated in FIG. 6.

FIG. 6 is a diagram illustrating a shape of a transparent film. The transparent film 245 in the present embodiment includes a front portion 245A located ahead of the center line C and a rear portion 245B located behind the center line C, and the front portion 245A and the rear portion 245B are inclined so as to be linearly symmetrical with respect to the center line C and to form a V shape.

Specifically, when the front portion 245A has a surface 245a1 facing the transparent substrate 240 and the rear portion 245B has a surface 245b1 facing the transparent substrate 240, the transparent film 245 is formed into a shape such that the angle θa of the surface 245a1 with respect to the horizontal surface P and the angle θb of the surface 245b1 with respect to the horizontal surface P have the same angle.

In the present embodiment, by forming the shape of the transparent film 245 into such a shape, the angle between each of the infrared light emitted from the infrared light sources 234-1 and the infrared light emitted from the infrared light sources 234-2, and the bottom face of the transparent substrate 240, can be made small. Hence, according to the present embodiment, in the detection box 300, infrared light can be emitted to the region R1 from the proximity of the opening 320 to the proximity of the center line C (see FIG. 2A) and the region R2 from the proximity of the center line C to the deepest portion (see FIG. 2A).

In the present embodiment, the central portion of the detection box 300 is irradiated with reflected light of the visible light emitted from the LED 233. That is, in the present embodiment, light of a wavelength different from that of infrared light can be emitted to the region R3 immediately lateral to the light source substrate 232 in the detection box 300.

Thus, according to the present embodiment, at least one of the first light and the second light (infrared light), and, the third light (visible light) can be emitted to the region from proximity of the opening 320 of the detection box 300 to the deepest portion, and the region capable of detecting the object can be expanded.

The above is an explanation of the detection device 200. Next, the detection box 300 will be described.

The detection box 300 of the present embodiment has light absorption properties for infrared light and visible light therein. That is, the inner surface of the detection box 300 has a reflective index of approximately 0% for infrared light and visible light. Thus, for example, when there is no object in the region R1 within the detection box 300, the infrared light and visible light are absorbed on the inner surface of the detection box 300 and are not reflected.

In the detection box 300 of the present embodiment, the reflective index of the inner surface (the inner surface of the upper wall, the inner surface of the bottom wall, and the inner surface of the side wall) is less than 0.1% (a preferable example of a "reflective index that is not responsive to infrared light"). In addition, In the present embodiment, the "reflective index of the inner surface of the detection box" is the ratio of the amount of light reflected by the infrared light (the output light) to the amount of light of the incident infrared light at the inner surface of the detection box 300.

Thus, the detection box 300 according to the present embodiment can inhibit false detection of an object caused by reflection of infrared light or visible light on the inner surface of the detection box 300 even though an object is not present in the detection box 30 (in the detectable space).

Specifically, for example, a black ABS resin, styrene, corrugated cardboard and the like can be used on the inner surface of the detection box 300 to inhibit the reflective index of infrared light.

In this case, the entire detection box 300 may be formed of these materials, or only the inner surface of the detection box 300 may alternatively be formed of these materials. For example, the inner surface of the detection box 300 may be coated with a variety of infrared light absorbing materials (for example, a polyurethane resin based infrared light absorbing material) to inhibit the reflective index of infrared light (e.g., less than 2%). In this case, the infrared light absorbing material may be a plate, a sheet, a film, a paint coating and the like. Here, the reflective index that is not responsive to infrared light may be determined depending on the light receiving sensitivity of the light receiver 236.

In the detection box 300 of the present embodiment, a tilt sensor may be provided at a lid 330. The tilt sensor changes the voltage when the tilt sensor tilts.

In the present embodiment, by attaching a tilt sensor to the lid 330 of the detection box 300, a state change from a horizontal state of the lid 330 housed at the top of the opening 320 to a vertical state of the closed lid 330, can be detected. Specifically, when the tilt sensor outputs 0 [V] in the horizontal state and 3 [V] in the vertical state, the output of the tilt sensor changes from 0 [V] to 3 [V] when the lid 330 is closed.

The detection box 300 of the present embodiment may detect the capture of the object based on a change of this signal.

In the detection unit 100 of the present embodiment, when the detection box 300 detects the capture of the object by the tilt sensor, the detection box 300 may notify the detection device 200 of the capture of the object.

Upon receiving this notification, the detection device 200 can detect the timing at which the object has been captured by driving the LED 233 and the infrared light source 234.

Moreover, the tilt sensor may use a four-way tilt sensor or a two-way tilt sensor. When the four-way tilt sensor is used, if the detection box 300 is tilted due to an earthquake and the like, the tilt can be detected.

The detection box 300 of the present embodiment may include a gesture sensor. A gesture sensor may be provided on the top face of the inside of the detection box 300. In the present embodiment, the movement (motion) of the object by the gesture sensor can be detected by providing the gesture sensor. Therefore, according to the present embodiment, it is possible to increase the reliability of detection of the object entering the detection box 300.

The gesture sensor may close the lid 330 when the moving direction of the object is rearward from the inlet toward the rear side. In this manner, the detected object entering the detection box 300 can be captured with a high probability.

In the present embodiment, the gesture sensor may be, for example, an optical gesture sensor module, and can detect an object having a height of about 5 cm. Therefore, in the detection box 300 having a height of 6 cm, the object was detected without any problem.

Next, the relationship between the light source substrate 232 and the transparent substrate 240 when the angle of the transparent film 245 is changed with respect to the transparent substrate 240 in the detection device 200 of the present embodiment will be described with reference to FIG. 7 and TABLES 1 and 2.

TABLE 1 shows results of measuring elevation angles of infrared light with respect to the top face 245a of the transparent film 245, elevation angles of infrared light with respect to the top face 240a of the transparent substrate 240, emission angles of infrared light with respect to the detection box 300, distances from the transparent substrate 240 to the light source substrate 232, and detectable areas when the tilt angle of the transparent film 245 with respect to the transparent substrate 240 is changed.

In TABLE 1, the detectable region indicates the length of the region to which infrared light is emitted in the detection box 300 in the front-back direction.

In TABLE 1, the wavelength of visible light emitted from the LED 233 was set to 520 nm, and the wavelength of infrared light emitted from the infrared light source 234 was set to 950 nm.

The inner surface of the detection box 300 was made black (reflective index of infrared light was less than 0.1%), and the dimension of the detection box 300 was set to 60 mm in height.

As can be seen from TABLE 1, in the detection device 200 in the present embodiment, the transparent substrate 240 was positioned parallel to the horizontal plane, and the angle between the transparent film 245 and the transparent substrate 240 was varied, so that the light source substrate 232 was disposed further away from the transparent substrate 240 and the emission angle with respect to the detectable region was also reduced.

For example, when comparing the comparative example in TABLE 1 with the examples 1 to 3, in Example 1, the detectable region was larger than that of the comparative example by 25 cm. In Example 2, the detectable region was larger than that of the comparative example by 61 cm. In Example 3, the detectable region was larger than that of the comparative example by 120 cm. In particular, the detectable region in Example 3 was about twice as large as that of the comparative example.

In Example 3, reflection of the infrared light from the top face 240a of the transparent substrate 240 needs to be considered. Therefore, in the detection device 200, an emission angle with respect to the detection box 300 is preferably set to an angle (25 degrees) of Example 1 or an angle (20 degrees) of Example 2, or an angle between the angle (25 degrees) of Example 1 and the angle (20 degrees) of Example 2. That is, the detection device 200 preferably tilts the transparent film 245 with respect to the transparent substrate 240 such that the emission angle with respect to the detection box 300 is about 20 degrees to about 25 degrees.

In the present embodiment, this can expand the detectable region within the detection box 300.

Figure 7:
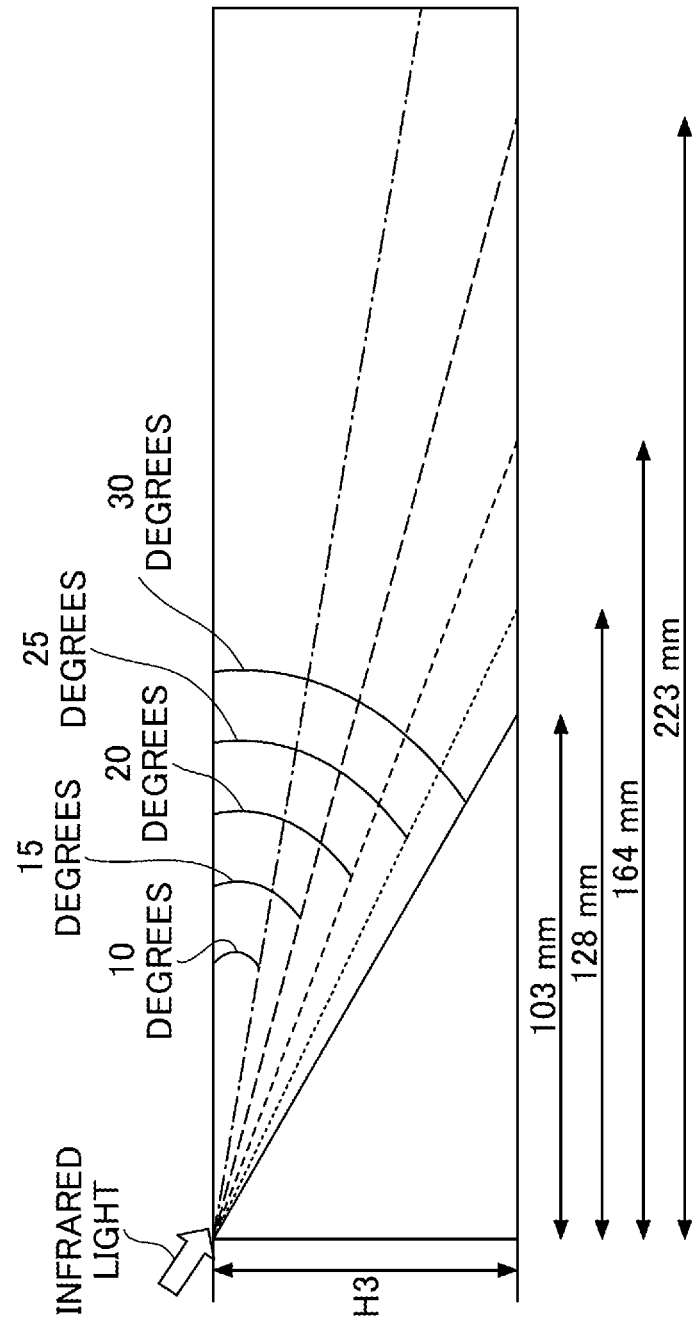
FIG. 7 is a diagram illustrating a relationship between an angle of emission of infrared light to a detection box and a detectable region.

FIG. 7 is a diagram illustrating a relationship between an emission angle of infrared light with respect to a detection box and a detectable region. In FIG. 7, H3 shows the height of the detection box 300. As illustrated in FIG. 7, it can be seen that the smaller the emission angle of the infrared light with respect to the detection box 300, the wider the detectable region in the front-back direction.

TABLE 1

| | INCLINED ANGLE OF TRANSPARENT FILM RELATIVE TO TRANSPARENT SUBSTRATE | ELEVATION ANGLE RELATIVE TO FRONT FACE OF TRANSPARENT FILM | ELEVATION ANGLE RELATIVE TO TOP FACE OF TRANSPARNT SUBSTRATE | EMISSION ANGLE TO DETECTION BOX | DISTANCE FROM TRANSPARENT SUBSTRATE TO LIGHT SOURCE [mm] | DETECTABLE AREA (HEIGH 60 [mm]) |
|---|---|---|---|---|---|---|
| COMPARATIVE EXAMPLE | 0 | 30 | 30 | 30 | 5 | 103 |
| EXAMPLE 1 | 10 | 35 | 25 | 25 | 7.5 | 128 |
| EXAMPLE 2 | 20 | 40 | 20 | 20 | 10 | 164 |
| EXAMPLE 3 | 30 | 45 | 15 | 15 | 12.5 | 223 |

Specifically, the examples have indicated that in order to increase the detectable region to 120 cm or more in a single infrared light source 234, the emission angle (angle from the horizontal plane) of the infrared light may be set to 25 degrees, and in order to increase the detectable region to 160 cm or more, the emission angle (angle from the horizontal plane) of the infrared light may be set to 20 degrees. Furthermore, the examples have indicated that in order to increase the detectable region to 220 cm or more in a single infrared light source 234, the emission angle of the infrared light (angle from the horizontal plane) may be set to 15 degrees.

The present embodiment has described a case in which the inside of the detection box 300 is made a detectable region of the detection device 200. However, the detectable region is not limited to the inside of the detection box 300. For example, in the present embodiment, the detection box 300 may or may not be provided. When the detection box 300 is not provided, the space to which at least one of visible light and infrared light transmitted from the window 210 of the detection device 200 becomes a detectable region.

In other words, when the detection box 300 is not present, the detectable region varies depending on the height of the free space corresponding to the height of the detection box 300. However, the width (length) of the detectable region illustrated in FIG. 7 is only proportional to the distance from the transparent substrate 240 to the light source substrate 232, and still depends on the emission angle of the infrared light.

TABLE 2 below shows detectable regions when the height of the detection box 300 is 1 [m] and the emission angles of infrared light are 25 degrees and 30 degrees, respectively.

TABLE 2

| | EMISSION ANGLE TO DETECTION BOX | DETECTABLE AREA (HEIGH 1 [m]) |
|---|---|---|
| EXAMPLE 4 | 30 | 171 [cm] |
| EXAMPLE 5 | 25 | 213 [cm] |

TABLE 2 indicates that a detectable region is 171 cm in Example 4 where the emission angle of infrared light is 30 degrees, and that a detectable region is 231 cm in Example 5 where the emission angle of infrared light is 25 degrees.

In addition, in the detection device 200 of the present embodiment, the region R3 disposed immediately lateral to the light source substrate 232 (see FIG. 2A) is unlikely to be irradiated with infrared light, and is more likely to be irradiated with visible light emitted from the LED 233.

Accordingly, in the present embodiment, the reflective plate 235 is disposed at a position inside the black shielding plate 231 and facing the light source substrate 232 so that the region R3 is irradiated with the visible light.

Any colored material of the reflective plate 235 of the present embodiment is effective except for black. However, when the reflective plate 235 is made white, the light receiver 236 may detect the reflected light even when there is no object because the reflected light is too intense.

Therefore, in the present embodiment, as shown in TABLE 3 below, the color of the reflective plate 235 was made aqua and green, and was evaluated as an example.

TABLE 3

| | REFLECTIVE MATERIAL (VINYL CHLORIDE) 0.2 mm-THICK | CAPABILITY AND INCAPABILITY OF DETECTION AT IMMEDIATELY LATERAL TO LIGHT SOURCE SUBSTRATE |
|---|---|---|
| EXAMPLE 6 | AQUA | CAPABLE |
| EXAMPLE 7 | GREEN | CAPABLE |
| COMPARATIVE EXAMPLE | ABSENT | INCAPABLE |

The material of the reflective plate 235 may be acrylic, vinyl chloride and the like. TABLE 3 indicates a comparative example in which the reflective plate 235 is not installed, Example 6 in which the reflective plate 235 is made aqua, and Example 7 in which the reflective plate 235 is made green.

In this case, in the comparative example, the object in the region R3 immediately lateral to the light source substrate 232 is not detected. In contrast, in both Example 6 and Example 7, it is found that detection of the object in the region R3 immediately lateral to the light source substrate 232 is possible.

Accordingly, in the present embodiment, by providing the reflective plate 235, the region immediately lateral to the light source substrate 232 on which the infrared light source 234 is disposed can be made a detectable region. In the present embodiment, the region R3 is a region immediately lateral to the light source substrate 232, and in other words, the region R3 is a region positioned opposite to the light source substrate 232.

Next, the operation of the detection device 200 according to the present embodiment will be described. Hereinafter, the hardware configuration of the detection device 200 according to the present embodiment will be described.

Figure 8:
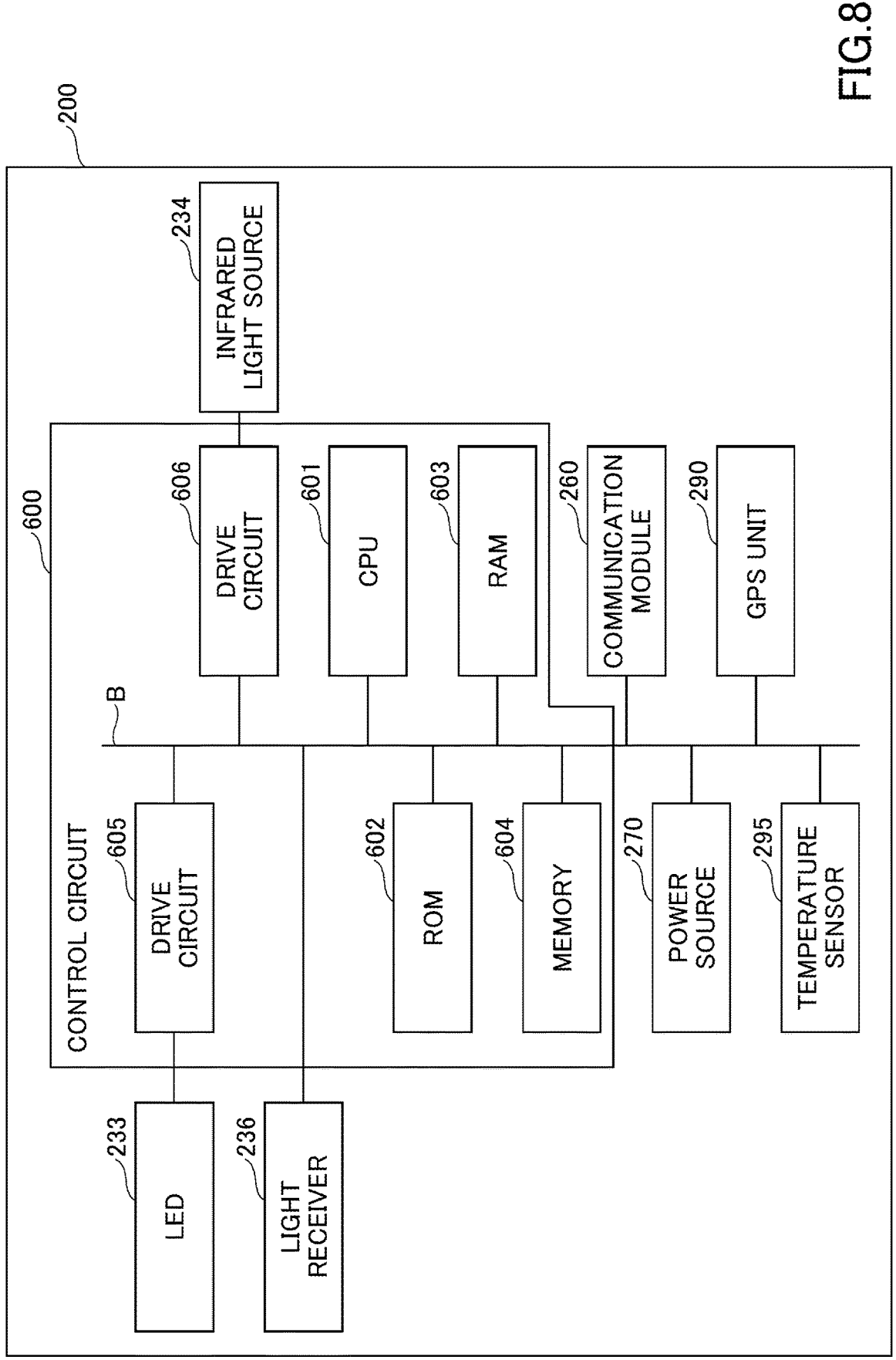
FIG. 8 is a diagram illustrating an example of a hardware configuration of a detection device according to the first embodiment.

FIG. 8 is a diagram illustrating an example of a hardware configuration of a detection device according to a first embodiment. The detection device 200 of the present embodiment includes an LED 233, a light receiver 236, a control circuit 600, a power source 270, a communication module 260, a GPS (Global Positioning System) unit 290, and a temperature sensor 295. These components are communicatively connected to each other via communication path B (e.g., a bus, an interconnection pattern, a connector, a cable and the like).

The control circuit 600 according to the present embodiment is a circuit mounted on the control substrate 250. In the present embodiment, the GPS unit 290, the temperature sensor 295 and the like may be also mounted on the control substrate 250.

The control circuit 600 of the present embodiment includes a CPU 601, a ROM 602, a RAM 603, a memory 604, a drive circuit 605, and a drive circuit 606.

The CPU 601 controls the operation of the entire detection device 200. The ROM 602 stores a program executed by the CPU 601. The RAM 603 is used as a work area of the CPU 601. The memory 604 stores various data. Examples of the memory 604 include an HDD (hard disk drive), an SSD (solid state drive) and the like.

A drive circuit 605 controls emission of visible light by the LED 233. For example, the drive circuit 605 supplies power to the LED 233 from the power source 270 to cause the LED 233 to emit visible light. The drive circuit 606 controls emission of infrared light by the infrared light source 234. For example, the drive circuit 606 supplies power from the power source 270 to the infrared light source 234 to emit infrared light.

The communication module 260 transmits and receives various data between the detection device 200 and an external device by performing wireless communication with the external device. For example, the communication module 260 transmits the detection result data representing the detection result of an object to the external device based on the control from the control circuit 600. For example, a Wi-Fi (registered Trademark), a Wi-LAN (Local Area Network) and the like are used for wireless communication by the communication module 260.

The GPS unit 290 receives radio waves from the GPS satellite, calculates the present position of the detection device 200 and outputs position information representing the present position. The GPS unit 290 may output time information representing the current time together with position information.

The temperature sensor 295 detects a temperature in the detection unit 230 and outputs temperature information representing the detected temperature.

Figure 9:
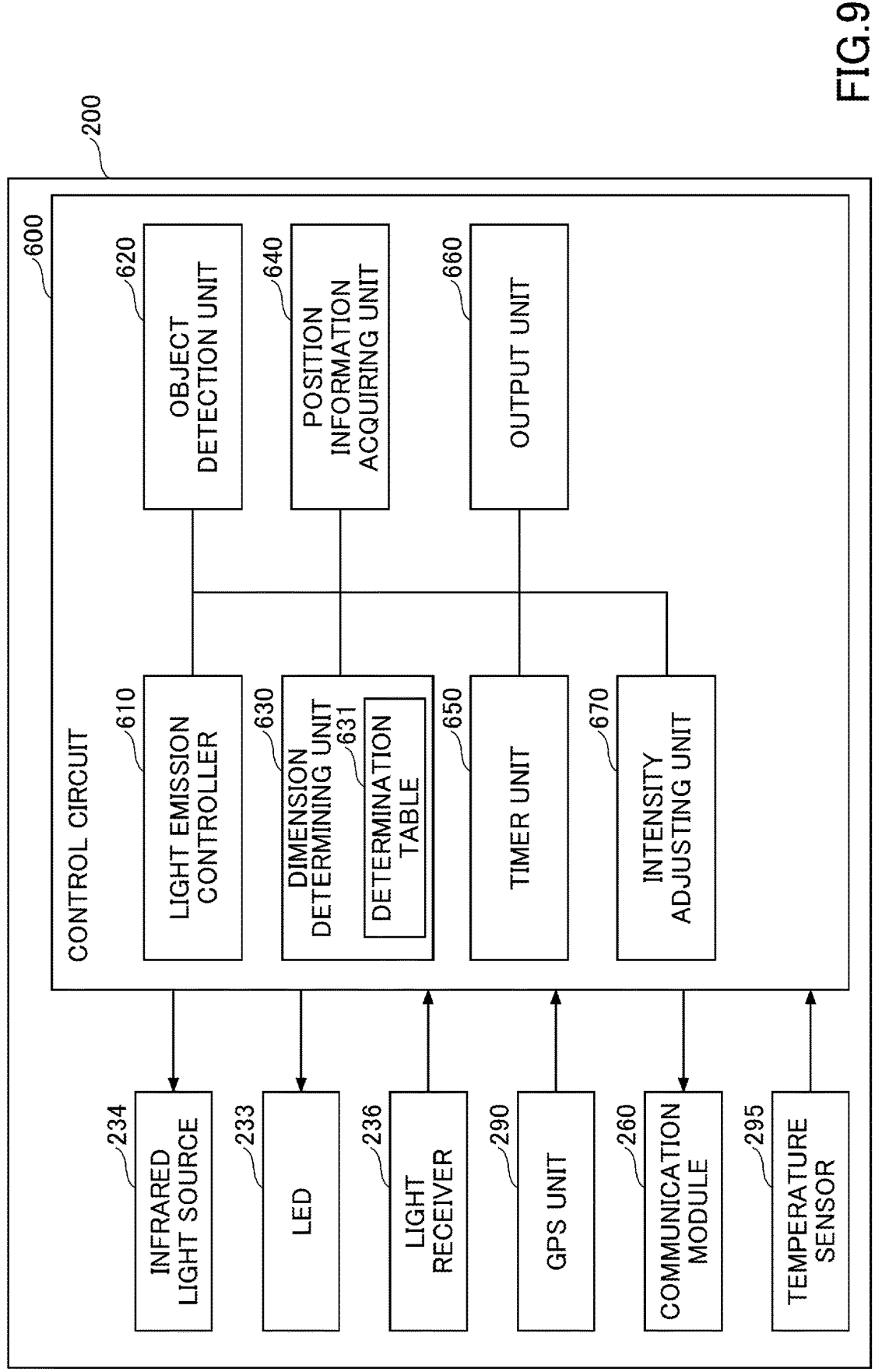
FIG. 9 is a diagram for explaining a function of a control circuit according to the first embodiment.

Next, a function of the control circuit 600 according to the present embodiment will be described with reference to FIG. 9. FIG. 9 is a diagram illustrating a function of a control circuit according to the first embodiment.

The control circuit 600 of the present embodiment includes a light emission controller 610, an object detecting unit 620, a dimension determining unit 630, a position information acquiring unit 640, a timer unit 650, an output unit 660, and an intensity adjusting unit 670.

The light emission controller 610 controls the emission of the LED 233 and the emission of the infrared light source 234. For example, the light emission controller 610 causes the LED 233 to emit visible light and causes the infrared light source 234 to emit infrared light when the power of the detection device 200 is turned on.

The object detecting unit 620 detects an object present in the detection box 300 based on a detection signal output from the light receiver 236. For example, the object detecting unit 620 is considered to detect an object when the output level of the detection signal output from the light receiver 236 is equal to or greater than a predetermined threshold value.

The dimension determining unit 630 determines the dimension of an object present in the detection box 300 based on the detection signal output from the light receiver 236. The dimension determining unit 630 according to the present embodiment determines that the greater the level of the detection signal, the greater the dimension of the object.

Specifically, the dimension determining unit 630 holds a determination table 631 and determines the dimension of the object based on the determination table 631. Details of the determination table 631 are described below.

The position information acquiring unit 640 acquires position information representing the present position of the detection device 200 from the GPS unit 290. The timer unit 650 measures the current time and outputs the time information representing the current time.

The output unit 660 outputs the detection result of the object by the object detecting unit 620 to an external device through the communication module 260 in association with the determination result of the dimension of the object by the dimension determining unit 630, the position information, and the time information.

The intensity adjusting unit 670 acquires the temperature information representing the temperature inside the detection unit 230 from the temperature sensor 295 and adjusts the relative intensity of the visible light emitted from the LED 233 and the infrared light emitted from the infrared light source 234 depending on the temperature inside the detection unit 230 indicated by the temperature information.

Specifically, the intensity adjusting unit 670 holds temperature characteristic information 671 indicating the relationship between: the output intensity of visible light and infrared light; and the temperature within the detection unit 230, and adjusts the intensity of the visible light and the infrared light with reference to the temperature characteristic information 671. Details of the temperature characteristic information 671 are described below.

For example, the light emission controller 610 is implemented by drive circuits 605 and 606 illustrated in FIG. 8. For example, the object detecting unit 620, the dimension determining unit 630, the position information acquiring unit 640, the timer unit 650, the output unit 660, and the intensity adjusting unit 670 are implemented by causing the CPU 601 illustrated in FIG. 8 to execute a program stored in the ROM 602.

Hereinafter, a determination table 631 will be described with reference to FIG. 10. FIG. 10 is a diagram illustrating an example of a determination table according to a first embodiment.

In the determination table 631 according to the present embodiment, the object is associated with the output level of the detected signal output from the light receiver 236.

Referring to the determination table 631 according to the present embodiment, the object is determined to be a corresponding object according to the output level of the detected signal output from the light receiver 236. For example, when the output level of the detected signal is 3.0 [V], the dimension determining unit 630 determines that the object is a harmful animal.

Figure 11:
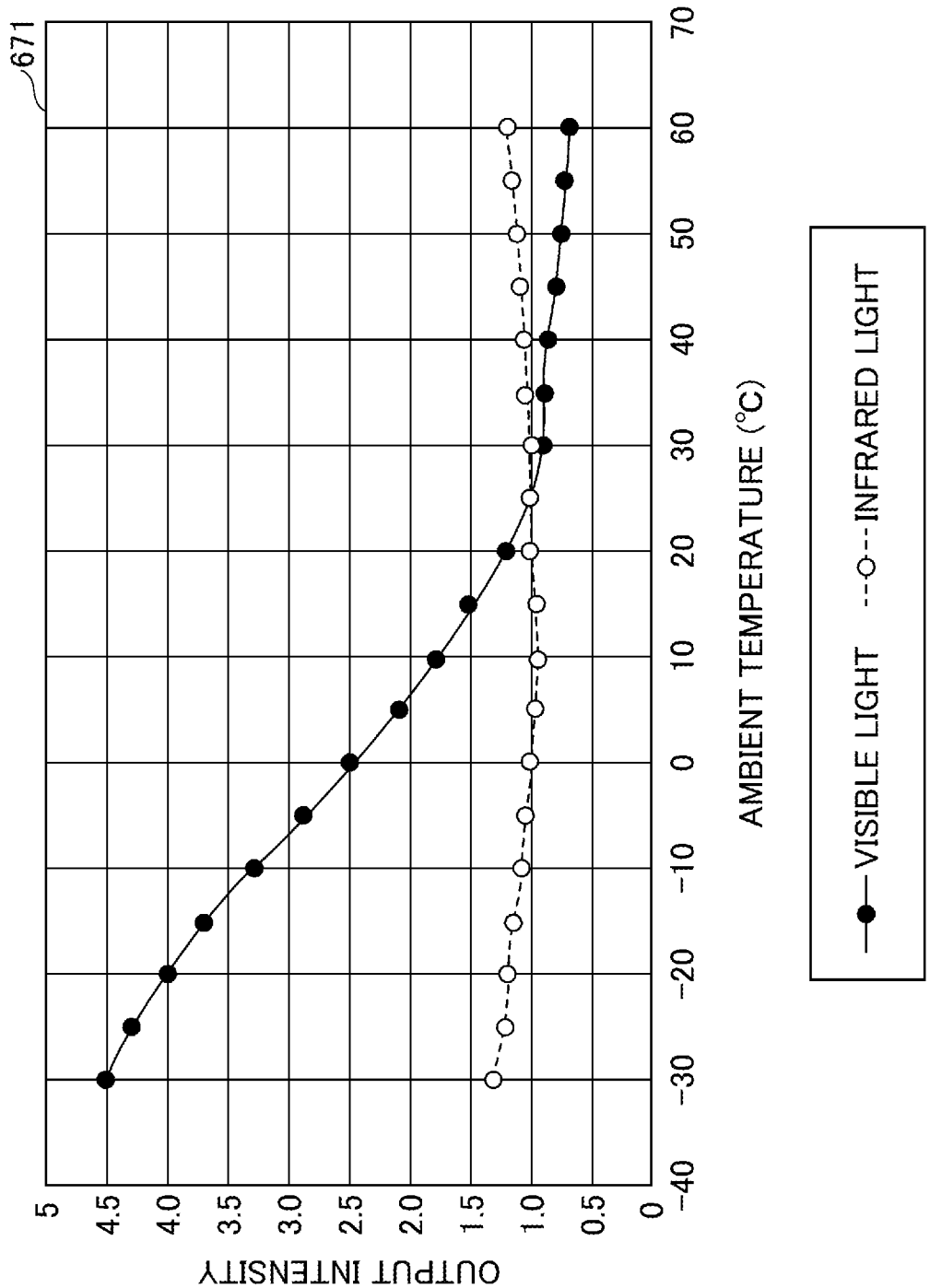
FIG. 11 is a diagram illustrating an example of temperature characteristic information showing a relationship between an output intensity of visible and infrared light and a temperature inside a detection unit.

Next, the temperature characteristic information 671 will be described with reference to FIG. 11. FIG. 11 is a diagram illustrating an example of temperature characteristic information illustrating the relationship between: the output intensity of visible light and infrared light; and the temperature inside the detection unit.

As illustrated in FIG. 11, the infrared light and visible light intensities vary depending on an ambient temperature. Accordingly, the detection device 200 according to the present embodiment adjusts the relative intensity of the visible light emitted from the LED 233 and the infrared light emitted from the infrared light source 234 according to the temperature inside the detection unit 230 by the intensity adjusting unit 670.

The control circuit 600 according to the present embodiment may include, for example, an environment detecting unit that detects environmental information related to the environment inside the detection device 200.

The environment detecting unit may, for example, be an odor sensor that detects odor, and the environmental information may, for example, be an odor detecting signal that represents the detected odor. When the control circuit 600 acquires the odor detecting signal from the environment detecting unit, the control circuit 600 may cause the output unit 660 to output the odor detecting signal in association with the detection result of the object detected by the object detecting unit 620 to an external device through the communication module 260.

For example, when the odor value is higher than the predetermined threshold value, the output unit 660 may output a notification that the odor value is higher than the predetermined threshold value, or a notification that an object detected in a target space or a detectable region is a living organism, to an external device through the communication module 260.

substrate 232. Here, a blue nonwoven material having a diameter of about 2 cm is used as an object in the detection box 300.

TABLE 4

| EMISSION ANGLE OF INFRARED LIGHT AND ANGLE OF TRANSPARENT SUBSTRATE | PRESENCE AND ABSENCE OF OBJECT DETECTION IN REGION R3 |
|---|---|
| 45 DEGREES | X (NO DETECTION) |
| 50 DEGREES | X (NO DETECTION) |
| 55 DEGREES | X (NO DETECTION) |
| 60 DEGREES | ○ (ABSENT WHEN NO REFLECTIVE PLATE) |
| 65 DEGREES | ○ (ABSENT WHEN NO REFLECTIVE PLATE) |
| 70 DEGREES | X DETECTION BY REFLECTIVE LIGHT BY SELF-LIGHTING: DETECTION EVEN WHEN NO OBJECT |
| 80 DEGREES | X DETECTION BY REFLECTIVE LIGHT BY SELF-LIGHTING: DETECTION EVEN WHEN NO OBJECT |
| 90 DEGREES | X DETECTION BY REFLECTIVE LIGHT BY SELF-LIGHTING: DETECTION EVEN WHEN NO OBJECT |

As described above, according to the present embodiment, the region to which at least one of visible light and infrared light is emitted can be expanded, and the region in which the object can be detected can be expanded.

Second Embodiment

A second embodiment will be described below with reference to the drawings. The second embodiment differs from the first embodiment in that emission angles of infrared light from the transparent substrate 240 are set to differ from each other instead of using the transparent film 245. Accordingly, the following description of the second embodiment describes the differences between the first embodiment and the second embodiment. For those having a functional configuration similar to the first embodiment, the same reference as those used in the description of the first embodiment are provided, and the description thereof is omitted.

Figure 12:
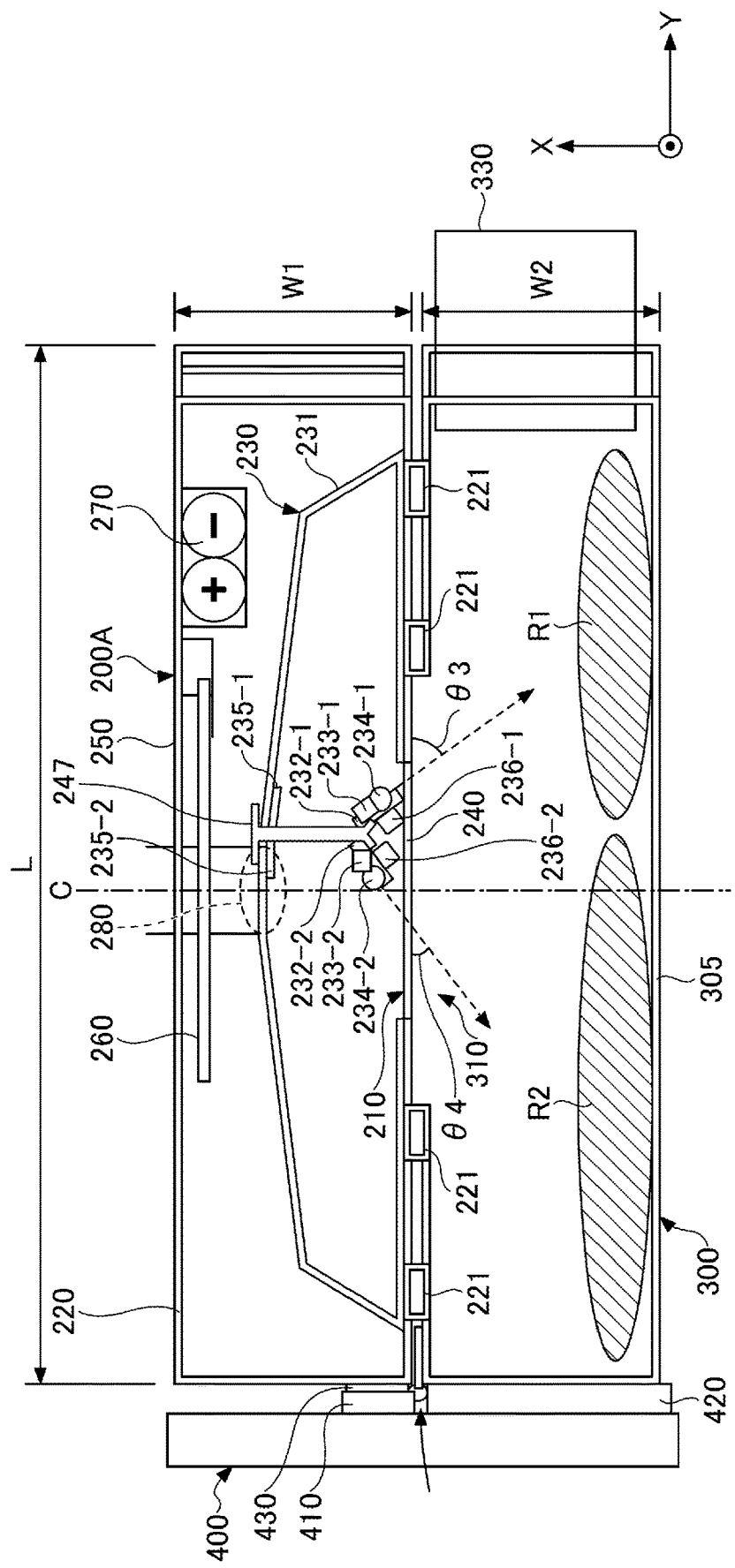
FIG. 12 is a diagram for explaining a detection unit according to a second embodiment.

FIG. 12 is a diagram illustrating a detection unit according to a second embodiment. Instead of using the transparent film 245, a detection device 200A in the present embodiment has different angles θ3 and θ4, which are angles of infrared light emitted from the transparent substrate 240 with respect to the bottom face 240b of the transparent substrate 240. The angle θ3 is the angle of the infrared light emitted from the infrared light sources 234-1 with respect to the bottom face 240b. The angle θ4 is the angle of the infrared light emitted from the infrared light sources 234-2 with respect to the bottom face 240b.

In the present embodiment, the angles of the infrared light emitted from the respective infrared light sources 234 are varied so that an object can be detected in the entire region within the detection box 300 including the region R3 immediately lateral to the light source substrate 232.

Referring to TABLE 4, an angle of infrared light emitted from the bottom face 240b of the transparent substrate 240 with respect to the bottom face 240b of the transparent substrate 240 will be described. TABLE 4 shows the results of examined angles of infrared light that can detect an object present in a region immediately lateral to the light source TABLE 4 indicates that when the angle of infrared light emitted from the transparent substrate 240 with respect to the bottom face 240b of the transparent substrate 240 is 70 degrees or more, the infrared light emitted from the infrared light source 234 is detected.

In addition, TABLE 4 indicates that when the angle of infrared light emitted from the transparent substrate 240 is set to 60 degrees with respect to the bottom face 240b of the transparent substrate 240 and the reflective plate 235 is provided, the object present in the region immediately lateral to the light source substrate 232 is detected.

Therefore, in the present embodiment, the visible light reflected from the reflective plate 235 increases the temperature of the object in the detection box 300 and generates infrared light, and the light receiver 236 receives the infrared light generated from the object.

Based on this result, in the present embodiment, the light source substrate 232-1 and the infrared light source 234-1 are arranged so that the angle θ3 is set to 60 degrees. In the present embodiment, the light source substrate 232-2 and the infrared light source 234-2 are arranged so that the angle θ4 is set to 45 degrees.

Further, in the detection device 200A of the present embodiment, the fixture 247 is positioned so as to be offset from the central portion 280. Specifically, the fixture 247 is disposed at a position shifted from the central portion 280 to the Y-axis positive side so that the light source substrate 232-2 is positioned in the Y-axis positive direction relative to the center line C.

In the present embodiment, by disposing the light source substrate 232 and the infrared light source 234 in this manner, the region R3 immediately lateral to the light source substrate 232 can be made a detectable region while causing the region R2 to reach the deepest portion of the detection box 300. Hence, according to the present embodiment, the region to which infrared light is emitted in the detection box 300 can be expanded, and the region from the opening 320 to the deepest portion of the detection box 300 can be made a detectable region.

Incidentally, the region R3 is made a region immediately lateral to the light source substrate 232 in the above, but is not limited thereto. In the present embodiment, for example, when the detection device 200A is positioned below the detection box 300, the region R3 becomes a region directly under the light source substrate 232. This positional relationship is common in all the embodiments.

Third Embodiment

A third embodiment will be described with reference to the drawings. The third embodiment differs from the second embodiment in that reflective plates vary in dimension. Accordingly, in the description of the third embodiment below, differences from the second embodiment are described, and same references are provided for components having functional configurations similar to those of the second embodiment, and the description thereof is omitted.

Figure 13:
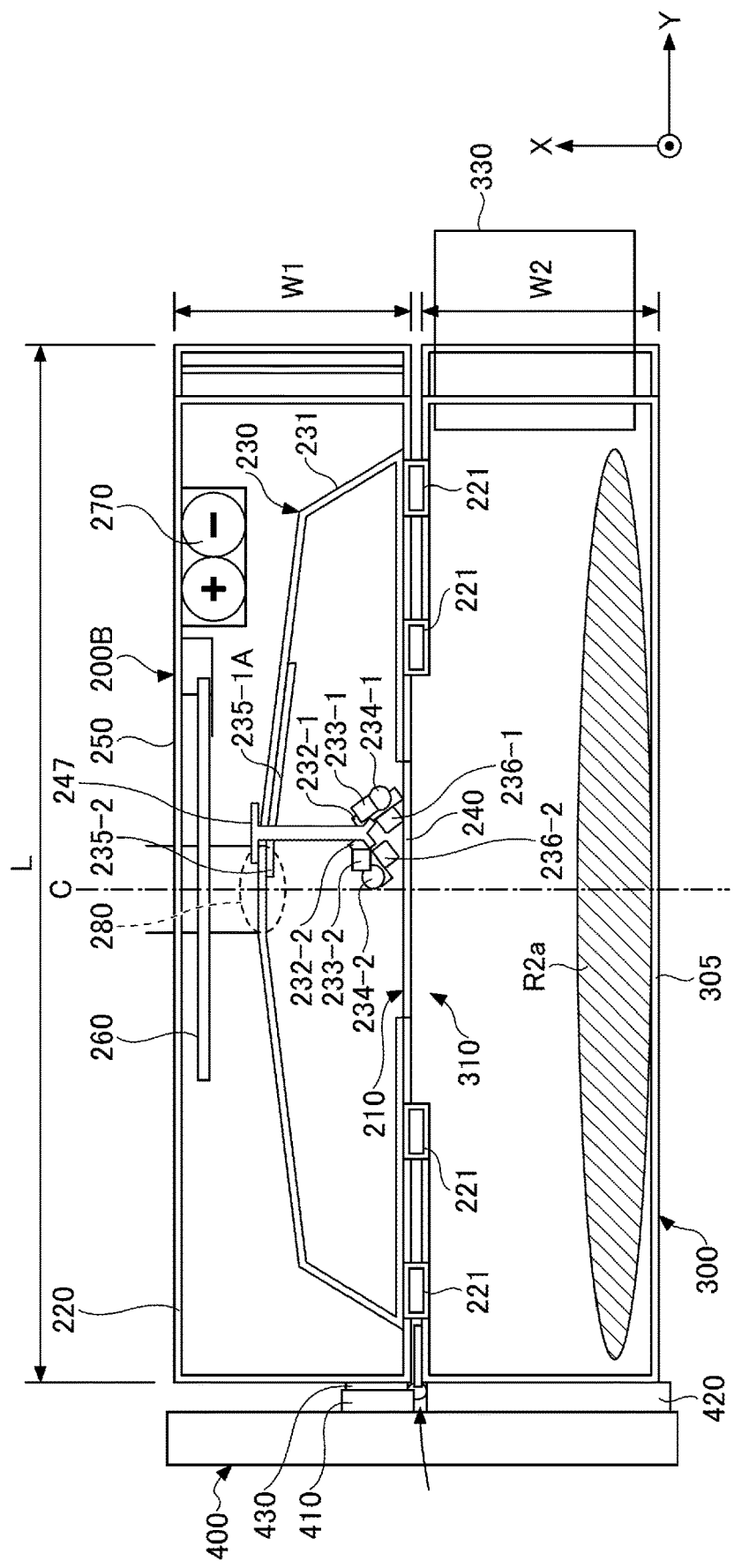
FIG. 13 is a diagram for explaining a detection unit according to a third embodiment.

FIG. 13 is a diagram illustrating a detection unit according to a third embodiment. In a detection device 200B of the present embodiment, the fixture 247, the light source substrate 232, and the infrared light source 234 are disposed in the same manner as those in the second embodiment. Moreover, the detection device 200B according to the present embodiment includes reflective plates 235-1A and 235-2.

The reflective plate 235-1A according to the present embodiment is larger in area than the reflective plate 235-2. Specifically, for example, if the reflective plate 235-2 is a rectangle with a short side being 1.5 cm and a long side being 5 cm, the reflective plate 235-1A may be a square with each side being 5 cm. When the reflective plates 235-1A and 235-2 have these dimensions, the area of the reflective plate 235-1A is about 3.3 times larger than that of the reflective plates 235-2.

In the present embodiment, the reflective plate 235-1A is larger than the reflective plate 235-2 so that the detection box 300 is sufficiently irradiated with reflected light of visible light emitted from the LED 233-1. In other words, the amount of visible light emitted to the detection box 300 is increased.

Thus, in the present embodiment, by increasing the amount of visible light emitted to the detection box 300, the amount of heat of the object within the detection box 300 is increased. As a result, the amount of infrared light emitted from the object increases. In the present embodiment, by increasing the amount of infrared light emitted from the object, the object can be detected by the light receiver 236.

In the present embodiment, by increasing the amount of visible light emitted to the detection box 300, a change in amount of heat in the detection box 300 is detected. Therefore, in the present embodiment, the region from the opening 320 to the deepest portion of the detection box 300 can be defined as an object detectable region R2a by a light receiver 236-2.

In the present embodiment, only the light receiver 236-2 may be used for detecting the object. In the present embodiment, a transparent film 245 and windows 210 and 310 have the same dimensions as those of the first and second embodiments, but the transparent film 240 and the windows 210 and 310 may be larger than those of the first and second embodiments.

Figure 14:
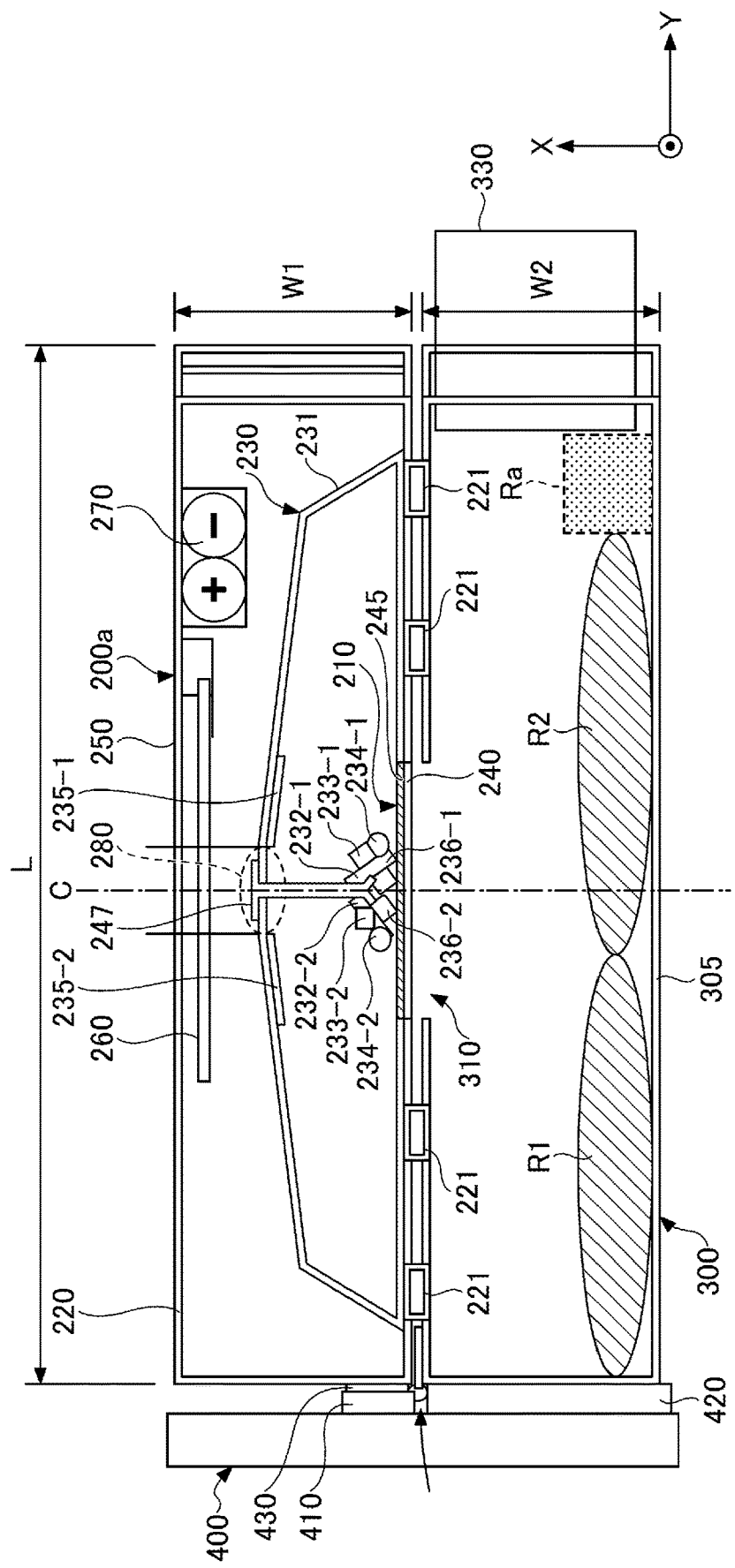
FIG. 14 is a diagram for explaining a comparative example.

Effects of the second and third embodiments will be described below with reference to FIG. 14. FIG. 14 is a diagram illustrating a comparative example.

In the detection device 200a illustrated in FIG. 14, a method of securing the light source substrate 232 to the fixture 247 and an arrangement of the infrared light source 234 in the light source substrate 232 are the same as those in the second embodiment, and the position of the fixture 247 is the same as that of the first embodiment. Accordingly, in the detection device 200a, the light source substrate 232-1 and the light source substrate 232-2 are disposed so that the center point between the light source substrate 232-1 and the light source substrate 232-2 is positioned on the center line C.

In this case, because the angle between the infrared light emitted from the light source substrate 232-1 and the bottom face 240b of the transparent substrate 240 is 60 degrees, a region Ra incapable of detecting an object is generated.

In the above-described second and third embodiments, by setting the center point between the light source substrate 232-1 and the light source substrate 232-2 to a position shifted from the center line C to the opening 320 side, the generation of a region Ra incapable of detecting the object can be prevented, and a region to which light is emitted can be expanded.

Fourth Example

A fourth embodiment will be described below with reference to the drawings. The fourth embodiment differs from the first embodiment in that the fourth embodiment is a system that includes multiple detection devices 200. Accordingly, in the description of the fourth embodiment below, differences from the first embodiment will be described, and the same references will be provided for those having functional configurations similar to those of the first embodiment, and the description thereof will be omitted.

Figure 15:
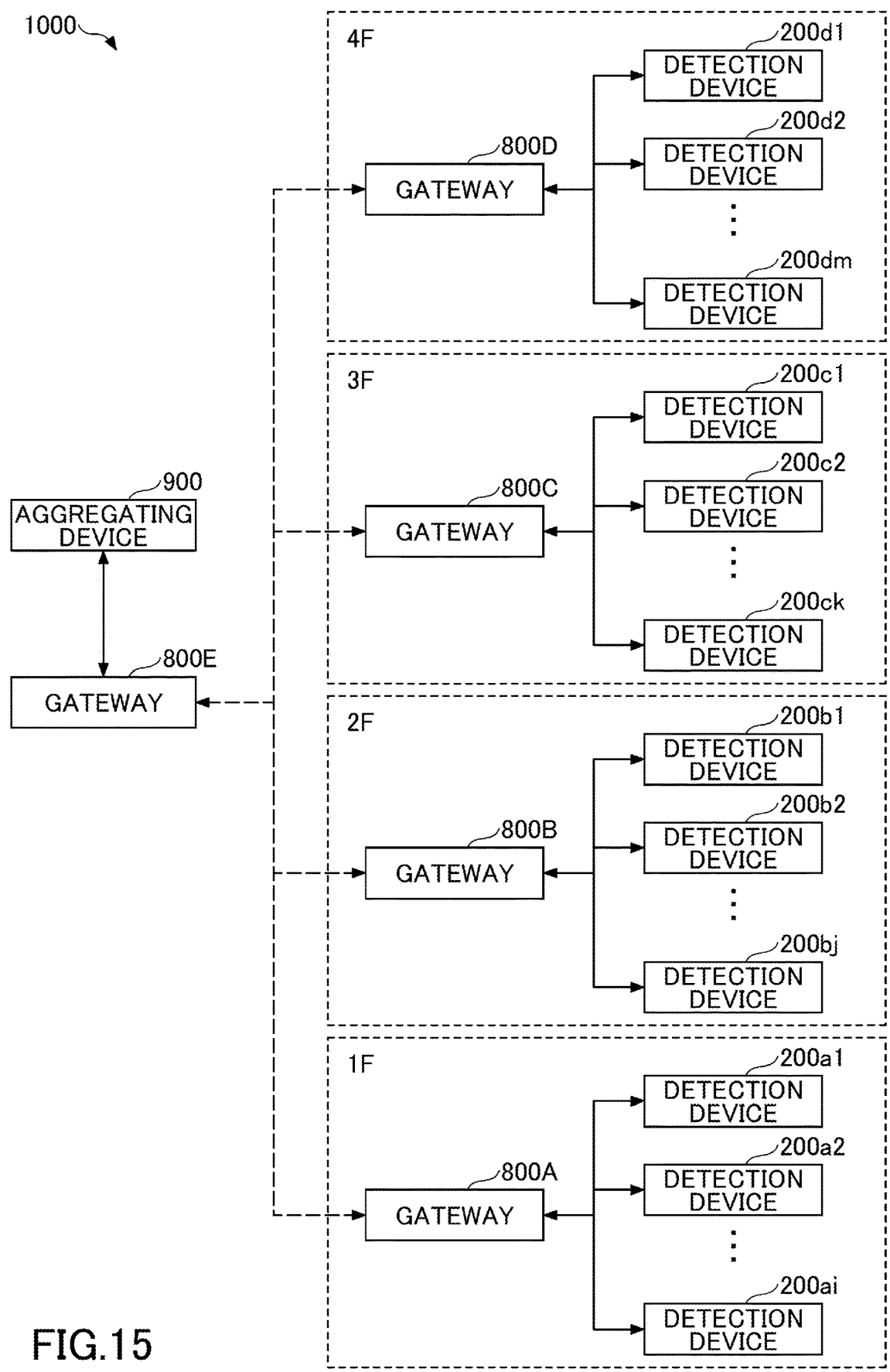
FIG. 15 is a diagram for illustrating an example of a detection system according to a fourth embodiment.

FIG. 15 is a diagram illustrating an example of a detection system according to the fourth embodiment. FIG. 15 illustrates an example where a detection system 1000 is applied to a building. The object of the detection system 1000 is not limited to the building.

The detection system 1000 of the present embodiment includes a plurality of detection devices 200, gateways 800A to 800E, and an aggregating device 900. The detection device 200 is located on each floor of the building. The detection device 200 located on the first floor of the building is referred to as detection devices 200a1 to 200ai. The detection device 200 located on the second floor of the building is referred to as detection devices 200b1 to 200bj. The detection device 200 located on the third floor of the building is referred to as detection devices 200c1 to 200ck. The detection device 200 located on the fourth floor of the building is referred to as detection devices 200d1 to 200dm. When indicating all of the detection devices, they are expressed as the detection device 200.

The gateway 800 relays communication between each detection device 200 and the aggregating device 900. The gateways 800 are located on each of the first to the fourth floors of the building. The first floor gateway 800A is connected to the detection devices 200a1 to 200ai, accumulates information output from the detection devices 200a1 to 200ai, and transmits the information to the aggregating device 900. The second floor gateway 800B is connected to the detection devices 200b1 to 200bj to collect information output from the detection devices 200b1 to 200bj and transmit the information to the aggregating device 900. The third floor gateway 800C is connected to the detection devices 200c1 to 200ck, accumulates information output from the detection devices 200c1 to 200ck, and transmits the information to the aggregating device 900. The fourth floor gateway 800D is connected to the detection devices 200d1 to 200dm, accumulates information output from the detection devices 200d1 to 200dm, and transmits the information to the aggregating device 900.

The aggregating device 900 is a device that aggregates the detection results obtained from each detection device 200. In the present embodiment, the aggregating device 900 is a computer terminal such as a personal computer, a smartphone, a tablet and the like, or a server device. The aggregating device 900 is an example of an "information processing apparatus." The gateway 800E is connected to the aggregating device 900. The gateway 800E is wirelessly connected to each of the gateways 800A to 800D.

The aggregating device 900 and the gateway 800E are connected via a communication network (e.g., Internet, wired LAN, wireless LAN) or wireless communication (e.g., LPWA (Low Power Wide Area)). The gateway 800 is not required. For example, if the aggregating device 900 is directly connected via wireless communication, the gateway 800E connected to the aggregating device 900 is not required. Further, when the detection device 200 is directly connected via wireless communication, the gateway 800 connected to the detection device 200 is not required.

Figure 16:
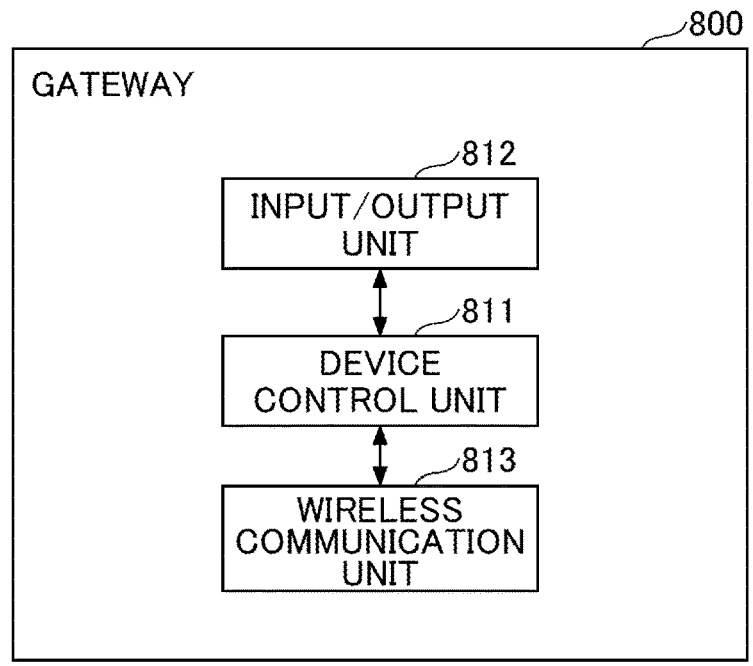
FIG. 16 is a block diagram illustrating a functional configuration of a gateway according to the fourth embodiment.

FIG. 16 is a block diagram illustrating a functional configuration of a gateway according to the fourth embodiment. The gateway 800 according to the present embodiment includes a device control unit 811, an input/output unit 812, and a wireless communication unit 813. The device control unit 811 controls the entire operation of the gateway 800.

Specifically, the device control unit 811 controls the relay of transmission and reception of information and commands through the input/output unit 812 and the wireless communication unit 813. The input/output unit 812 transmits and receives information, commands and the like to and from the detection device 200 or the aggregating device 900 via wired communication or wireless communication. The wireless communication unit 813 transmits and receives information, commands and the like to other gateways 800 via wireless communication.

Figure 17:
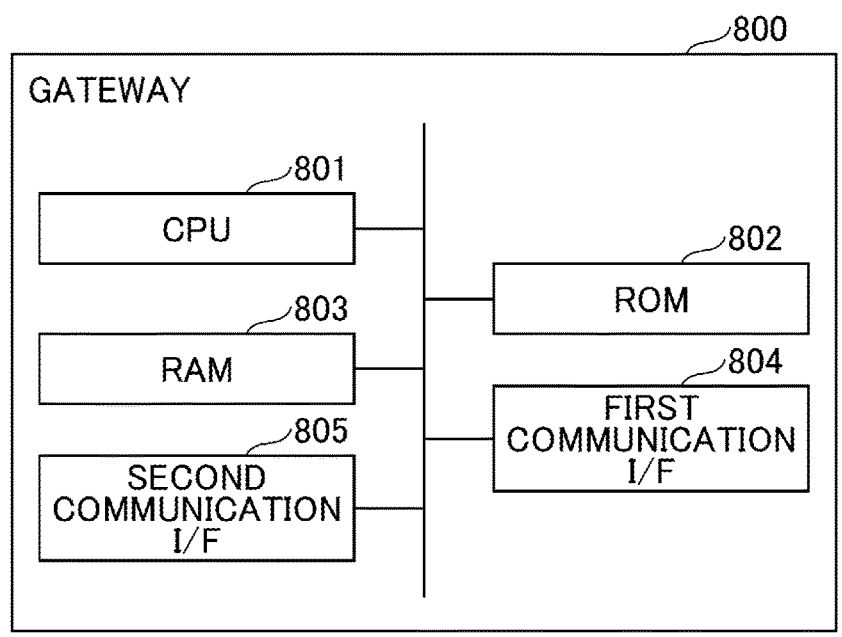
FIG. 17 is a diagram illustrating a hardware configuration of a gateway according to the fourth embodiment.

FIG. 17 is a diagram illustrating a hardware configuration of a gateway according to a fourth embodiment. A gateway 800 includes a CPU 801, a ROM 802, a RAM 803, a first communication interface (I/F) 804, and a second communication I/F 805.

The CPU 801, the ROM 802, and the RAM 803 implement functions of the device control unit 811. The functions of the CPU 801, the ROM 802, and the RAM 803 are similar to those of the CPU 201, the ROM 202, and the RAM 203 according to the first embodiment. The apparatus control 811 may be implemented by a program execution portion such as the CPU 801, implemented by a circuit, or by a combination of a program execution portion and a circuit.

The first communication I/F 804 implements the function of the input/output unit 812. The second communication I/F 805 implements the function of the wireless communication unit 813. For example, the first communication I/F 804 and the second communication I/F 805 may be composed of communication circuits.

Figure 18:
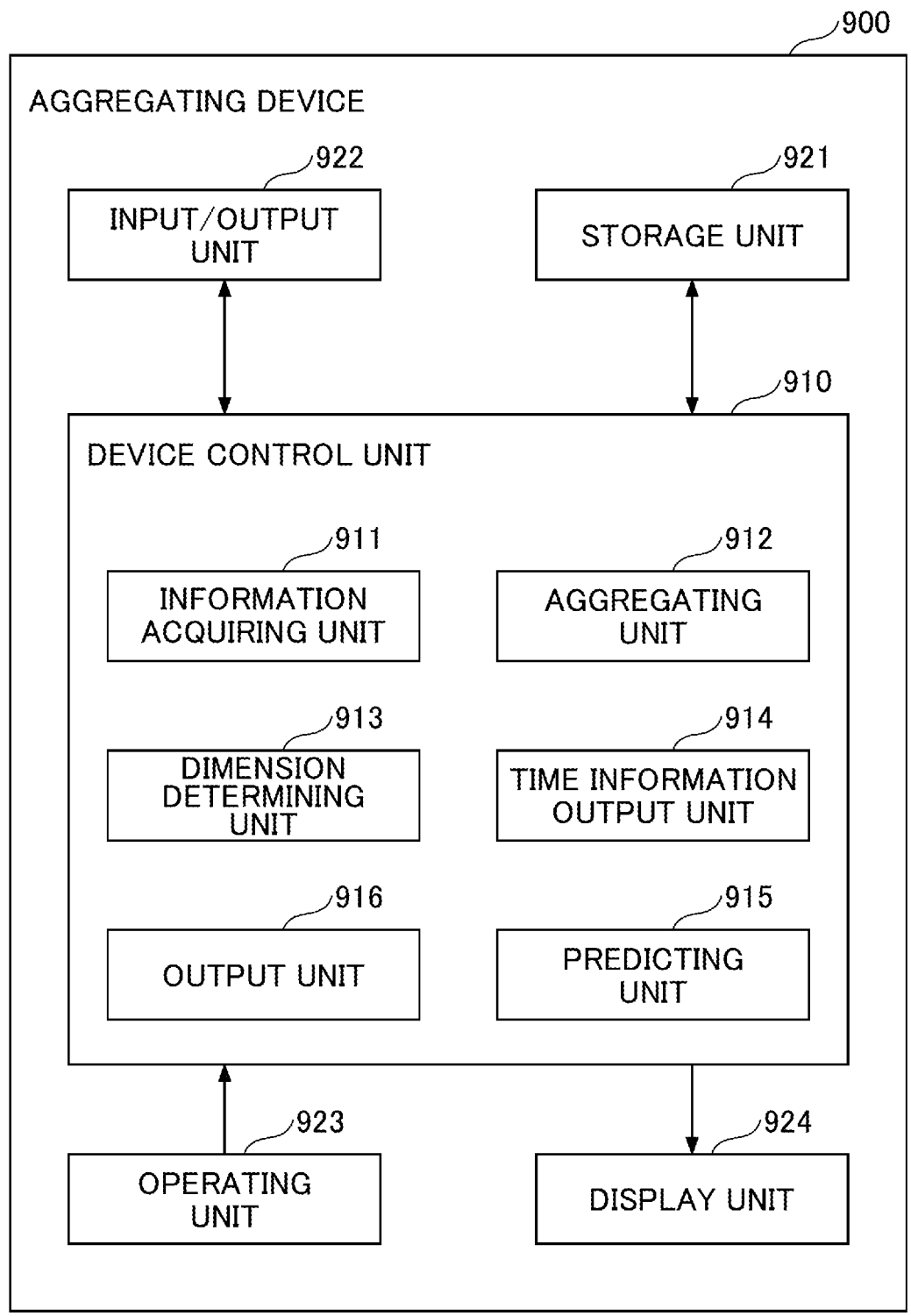
FIG. 18 is a diagram illustrating an example of a functional configuration of an aggregation device according to the fourth embodiment.

FIG. 18 is a diagram illustrating an example of a functional configuration of an aggregating device according to a fourth embodiment. The aggregating device 900 includes a device control unit 910, a storage unit 921, an input/output unit 922, an operation unit 923, and a display unit 924.

The storage unit 921 stores various types of information. For example, the storage unit 921 stores output information and the like of the device control unit 910. The storage unit 921 may store information about the building in which the detection device 200 is disposed. For example, information about the building may include the structure of the building and the like.

The input/output unit 922 is connected to the gateway 800E via wired or wireless communication and transmits and receives information, a command and the like to the gateway 800E.

The operation unit 923 receives an operation, information, and a command input from a user of the aggregating device 900 and outputs the input to the device control unit 910. The display unit 924 displays various types of information (for example, aggregated data).

The device control unit 910 includes an information acquiring unit 911, an aggregating unit 912, a dimension determining unit 913, a time information output unit 914, a predicting unit 915, and an output unit 916.

The information acquiring unit 911 acquires information transmitted from each detection device 200 through the input/output unit 922. The information acquired by the information acquiring unit 911 includes, for example, identification information of the detection device 200, position information of the detection device 200, time information, a detection result of an object, a determination result of an object dimension and the like.

The dimension determining unit 913 determines the dimension of an object detected by each detection device 200, similar to the dimension determining unit 630 of the detection device 200. However, when the information acquired by the information acquiring unit 911 includes the determination result of the dimension of the object, the dimension determining unit 913 may determine the dimension of the object based on the determination result.

The time information output unit 914 outputs time information. For example, the time information output unit 914 may clock the current time and output time information representing the current time similar to the timer unit 650 of the detection device 200. However, when time information is included in the information acquired by the information acquiring unit 911, the time information output unit 914 may output time information.

The predicting unit 915 predicts a movement of an object from the detection result of the object at each detection device 200. For example, when a detection device 200 that is not detecting an object is present around a detection device 200 that is detecting an object, the predicting unit 915 predicts that a direction moving from the detection device 200 that is detecting the object to the detection device 200 that is not detecting the object is a moving direction of the object. However, the predicting unit 915 may use any known method to predict the moving direction of the object.

The aggregating unit 912 generates aggregated data that aggregates the information acquired from each component of the device control unit 910. For example, the aggregating unit 912 may aggregate information output from the information acquiring unit 911, the dimension determining unit 913, and the time information output unit 914, and may generate aggregated data as illustrated in FIG. 19. For example, the aggregating unit 912 may aggregate information output from the information acquiring unit 911, the dimension determining unit 913, the time information output unit 914, and the predicting unit 915, and may generate aggregated data as illustrated in FIG. 20.

The output unit 916 outputs the aggregate data output from the aggregating unit 912. For example, the output unit 916 displays the aggregated data output from the aggregating unit 912 on the display unit 924. For example, the output unit 916 stores the aggregated data output from the aggregating unit 912 in the storage unit 921.

FIG. 19 is a first diagram illustrating an example of aggregated data according to a fourth embodiment. In FIG. 19, the aggregated data includes identification information of the detection device 200, the presence or absence of detection of an object, the position of the detection device 200 in the building, and the date and time of detection of the object. The aggregated data may include information representing the dimension of the detected object in addition to the information of FIG. 19.

Figure 20:
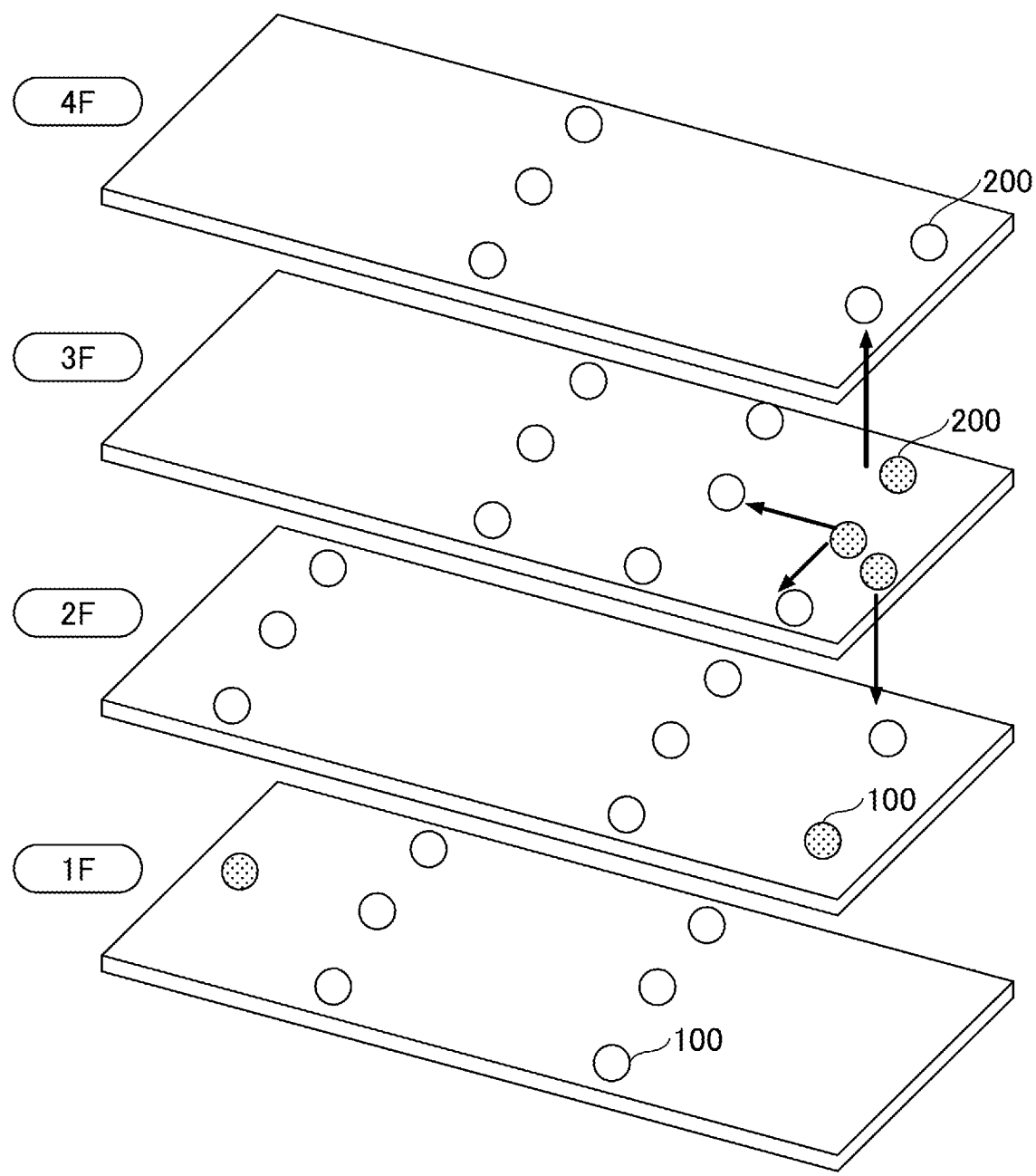
FIG. 20 is a second diagram illustrating an example of aggregated data according to the fourth embodiment.

FIG. 20 is a second diagram illustrating an example of aggregated data according to a fourth embodiment. In FIG. 20, the aggregated data includes a position of each detection device 200 in the drawing illustrating each floor of the building, the presence or absence of detection of objects (dots in the drawing when "presence") in each detection device 200, and the predicted directions of movements of objects (arrows in the drawing).

Figure 21:
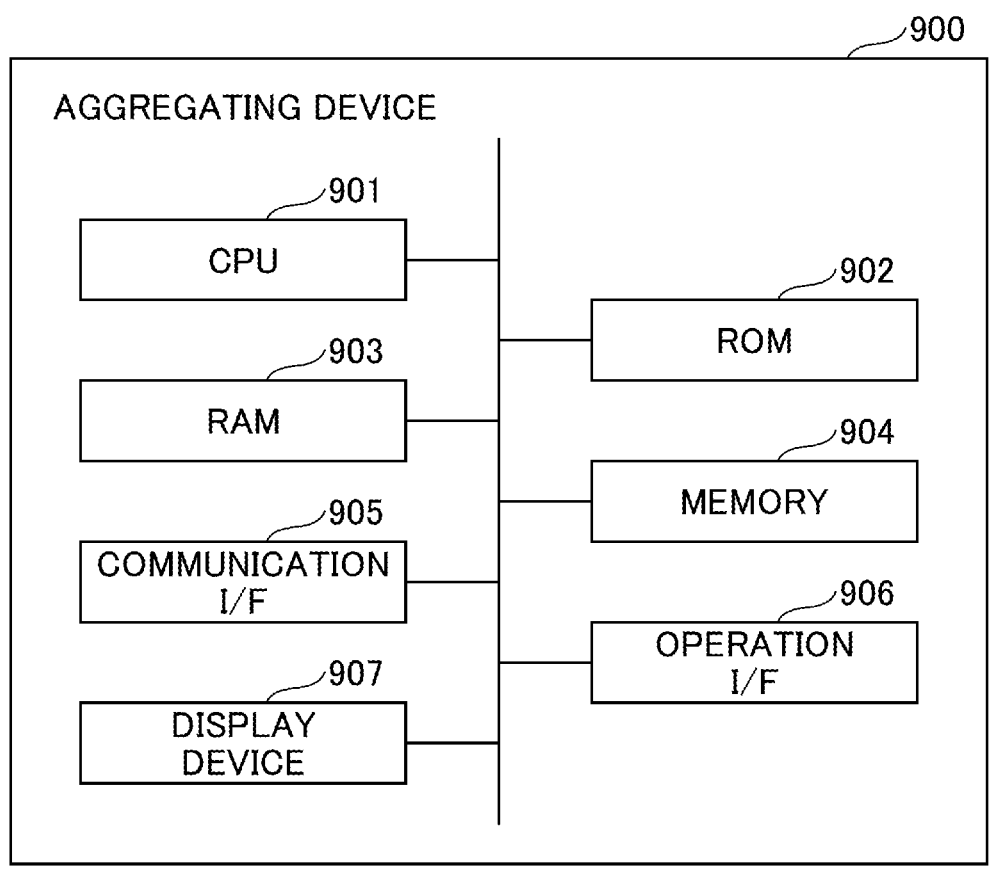
FIG. 21 is a block diagram illustrating a hardware configuration of an aggregation device according to the fourth embodiment.

FIG. 21 is a block diagram illustrating a hardware configuration of an aggregating device according to a fourth embodiment. As illustrated in FIG. 21, an aggregating device 900 includes a CPU 901, a ROM 902, a RAM 903, a memory 904, a communication I/F 905, an operation I/F 906, and a display device 907.

The CPU 901, the ROM 902 and the RAM 903 implements a function of a device control unit 910 illustrated in FIG. 18. The functions of the CPU 901, the ROM 902 and the RAM 903 are similar to those of the CPU 201, the ROM 202 and the RAM 203 according to the first embodiment. The device control unit 910 may be implemented by a program execution unit such as the CPU 901, implemented by a circuit, or by a combination of a program execution section and a circuit.

The memory 904 implements the function of the storage unit 921 illustrated in FIG. 18. The memory 904 may comprise a storage device such as a volatile or non-volatile semiconductor memory, an HDD, or an SSD. Note that the memory 904 may include the ROM 902 and/or the RAM 903.

The communication I/F 905 implements the function of the I/O unit 922 illustrated in FIG. 18. For example, the communication I/F 905 may be composed of communication circuitry. The operation I/F 906 implements the function of the operation unit 923. The operation I/F 906 may include an input device such as a button, a dial, a key, a touch panel and a microphone for audio input, a camera for image input and the like.

The display device 907 implements a function of the display unit 924 illustrated in FIG. 18. The display device 907 may be a display such as a liquid crystal panel, an organic EL (electroluminescence), an inorganic EL (electroluminescence), and an electronic paper display. The display device 907 may be a touch panel serving as an operation I/F 906. The display device 907 may include a speaker.

As described above, the detection system 1000 of the present embodiment includes a plurality of detection devices 200 and an aggregating device 900, and the aggregating device 900 includes an information acquiring unit 911 for acquiring detection result information representing a detection result of an object from each of the plurality of detection devices 200, an aggregating unit 912 for generating aggregated data by aggregating the plurality of detection result information acquired by the information acquiring unit 911, and an output unit 916 for outputting the aggregated data generated by the aggregating unit 912.

This allows the detection system 1000 to output aggregated data aggregating detection results of the detection device 200 disposed at various locations. Further, the detection system 1000 according to the second embodiment can reduce false detection of each detection device 200, and thus the accuracy of the aggregated data can be improved.

Also, in the detection system 1000 of the present embodiment, the aggregating device 900 further includes a predicting unit 915 for predicting movement of an object based on the aggregate data generated by the aggregating unit 912.

Thus, the detection system 1000 of the present embodiment can predict a movement of a movable object.

Figure 22:
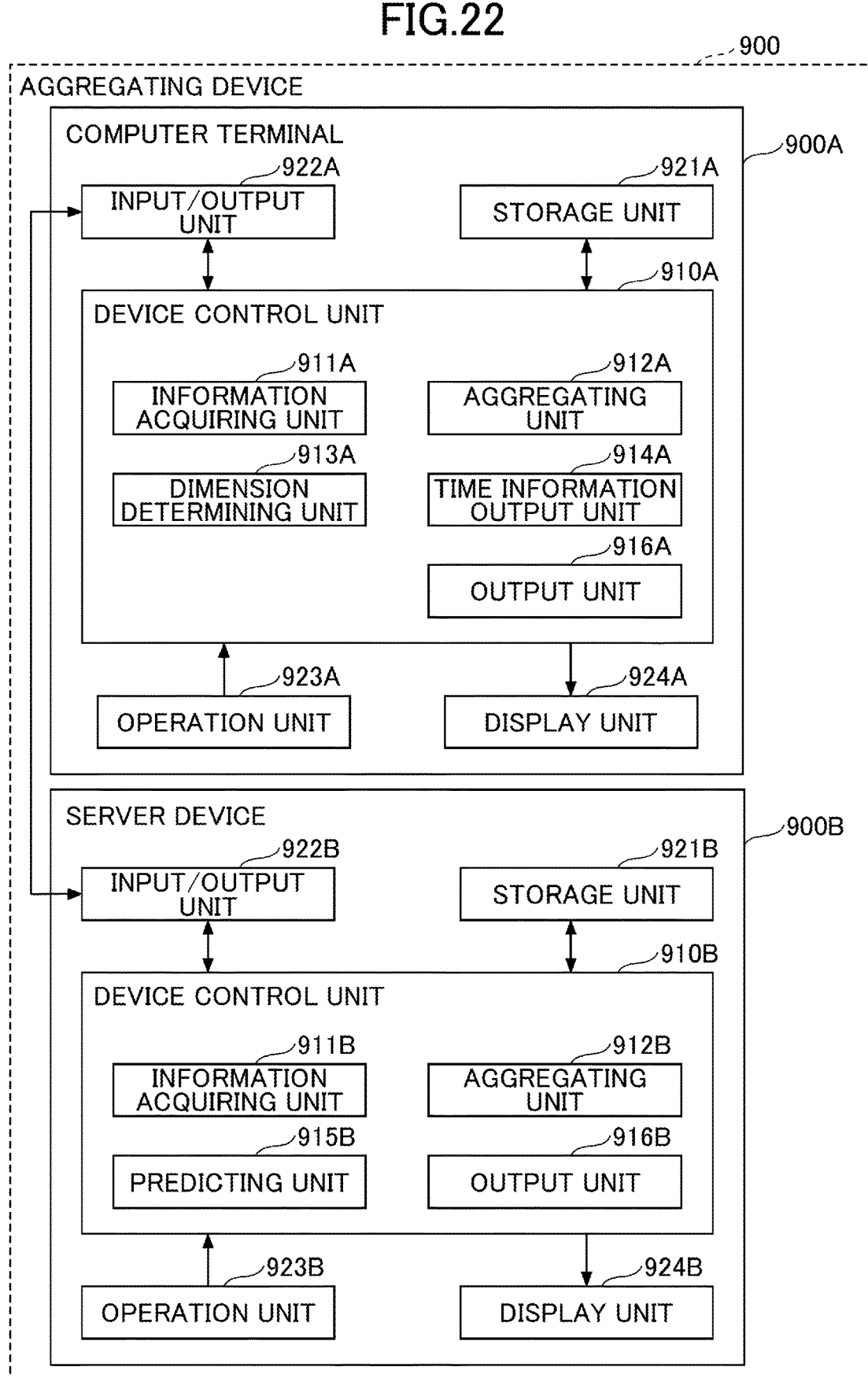
FIG. 22 is a diagram illustrating an exemplary variation of the functional structure of the aggregation device.

FIG. 22 is a diagram illustrating one variation of a functional configuration of an aggregating device. For example, the aggregating device 900 may comprise a computer terminal 900A and a server device 900B. The hardware configuration of each of the computer terminal 900A and the server device 900B is the same as that of the aggregating device 900 according to the second embodiment.

The computer terminal 900A includes a device control unit 910A, a storage unit 921A, an input/output unit 922A, an operation unit 923A, and a display unit 924A. The device control unit 910A includes an information acquiring unit 911A, an aggregating unit 912A, a dimension determining unit 913A, a time information output unit 914A, and an output unit 916A. Functions of the above-described components of the computer terminal 900A are similar to the homonymous components provided by the aggregating device 900 according to the second embodiment, respectively.

The input/output unit 922A is connected to the input/output unit 922B of the server device 900B through wired communication or wireless communication and transmits and receives information, commands and the like to the server device 900B. The output unit 916A outputs the aggregated data acquired from the aggregating unit 912 to the display unit 924, the server device 900B and the like.

The server device 900B includes a device control unit 910B, a storage unit 921B, an input/output unit 922B, an operation unit 923B, and a display unit 924B. The device control unit 910B includes an information acquiring unit 911B, an aggregating unit 912B, a predicting unit 915B, and an output unit 916B. Functions of the above-described components of the server device 900B are similar to the homonymous components provided by the aggregating device 900 according to the second embodiment, respectively.

The predicting unit 915B predicts the movement of an object in each detection device 200 using information acquired from the computer terminal 900A. The aggregating unit 912B generates aggregated data aggregating the information obtained from the computer terminal 900A and the prediction results of the predicting unit 915B. The output unit 916B outputs the aggregated data generated by the aggregating unit 912B to the display unit 924B and the like.

As discussed described above, according to the present embodiment, the detection device can expand a region area to which light is emitted.

While the preferred embodiments of the invention have been described in detail above, the invention is not limited to these embodiments, and various modifications or variations can be made within the scope of the invention as defined in the appended claims.

For example, the detection device 200 may be used without the detection box 300. That is, the detection device 200 is not limited to the use for detecting an object in the detection box 300, but may be used for detecting an object in other detectable spaces (e.g., interiors and the like).

In an embodiment, the LED 233 is used as a light source of visible light emitted to a region in which infrared light from the infrared light source 234 is difficult to reach, but is not limited thereto, and may be used in other applications. For example, the LED 233 may be used in an initialization check operation of the detection device 200. In this case, when the power of the detection device 200 is turned on, the detection device 200 turns on the LED 233 for a certain period of time and checks a state of the power source.

Next, the detection device 200 lights only the LED 233. Moreover, the detection device 200 turns off the LED 233 while the infrared light source 234 is turned on after the LED is turned on. On this occasion, for example, because an object is not present in the detection box 300, the detection device 200 does not detect the object. The detection device 200 determines the detection result of the light receiver 236 at this time to be an initial state.

The detection device 200 may detect the presence or absence of an object based on the change of the detection result to the initial state. Accordingly, the detection device 200 can detect an object without continuously tuning on the LED 233 and the infrared light source 234 during operation, thereby enabling energy saving.

The ordinal numbers, quantities and the like used above are all exemplary for the purpose of illustrating the art of the present invention, and the present invention is not limited to the exemplary numbers. The connection relationship between the components is exemplified for the purpose of illustrating the technology of the present invention, and the connection relationship that achieves the function of the present invention is not limited thereto.

Also, in the functional block diagram, the division of the blocks is an example and the blocks may be realized as one block, the blocks may be divided into two or more, and/or some functions may be transferred to other blocks. The functions of multiple blocks with similar functions may also be processed in parallel or by time sharing by a single hardware or software.

What is claimed is:
1. A detection device, comprising:
a first light source configured to emit a first light in a first direction;
a second light source configured to emit a second light in a second direction different from the first direction;
a light receiver configured to receive one of a first reflected light of the first light and a second reflected light of the second light;
a black shielding plate to surround a light source substrate including the first light source, the second light source, and the light receiver;
an outer housing to surround the black shielding plate; and
a transparent member configured to pass the first light and the second light to outside of the outer housing.
2. The detection device as claimed in claim 1, wherein a middle point between a first position at which the first light source is positioned and a second position at which the second light source is positioned, is shifted from a center line of the transparent member.
3. The detection device as claimed in claim 1, wherein the black shielding plate includes a reflective plate at a position facing the light source substrate,
wherein the reflective plate includes a first reflective plate provided over the first light source, and a second reflective plate provided over the second light source, and
wherein the first reflective plate has an area larger than an area of the second reflective plate.
4. The detection device as claimed in claim 3,
wherein the light source substrate includes a third light source configured to emit a third light having a wavelength different from a wavelength of the first light and a wavelength of the second light in a third direction different from the first direction and the second direction, and
wherein the reflective plate reflects the third light.
5. The detection device as claimed in claim 4,
wherein the light source substrate includes both a first light source substrate including the first light source and a second light source including the second light source, and
wherein an infrared light absorbing member is provided between the first light substrate and the second light substrate, and
wherein said third light source is a plurality of third light sources, one third light source disposed on the first light source substrate and another third light source disposed on the second light source substrate, the one first light source substrate and the another third light substrate emitting third light in a direction different from each other.
6. The detection device as claimed in claim 1, further comprising:
a transmitter configured to transmit a detection signal indicating that the light receiver receives the one of the first reflected light and the second reflected light to an external device.
7. The detection device as claimed in claim 1,
wherein the outer housing includes a first window at a position overlapping the transparent member, and
wherein the outer housing is disposed on a vibration absorbing member.
8. The detection device as claimed in claim 1, wherein the transparent member is disposed at a position adjacent to the light source substrate.
9. A detection unit, comprising:
a detection device;
a first light source provided in the detection device and configured to emit a first light in a first direction;
a second light source provided in the detection device and configured to emit a second light in a second direction different from the first direction;
a light receiver provided in the detection device and configured to receive one of a first reflected light of the first light and a second reflected light of the second light;
a black shielding plate to surround a light source substrate including the first light source, the second light source, and the light receiver;
an outer housing provided in the detection device and configured to surround the black shielding plate;
a transparent member provided in the detection device and configured to pass the first light and the second light to outside of the outer housing;
an outer housing provided in the detection device and including a first window at a position corresponding to the transparent member;

a detection box;

a second window disposed in the detection box at a position facing the first window;

an opening provided in the detection box and configured to allow an object to enter the detection box; and a lid provided in the detection box and configured to detect that the object enters the detection box and to close the opening.

10. A detection device, comprising:

a first light source configured to emit a first light in a direction;

a second light source configured to emit a second light having a different wavelength from the first light in a second direction different from the first direction;

a light receiver configured to receive a first reflected light of the first light and a second reflected light of the second light;

a black shielding plate to surround a light source substrate including the first light source, the second light source, and the light receiver; and a second transparent member disposed between the first transparent member and the light source substrate.

11. The detection device, as claimed in claim 10, wherein the second transparent member is disposed inclined to rise relative to the first transparent member with respect to a traveling direction of the second light.

12. A detection unit, comprising:

the detection device as claimed in claim 10;

a detection box;

a second window disposed in the detection box at a position facing the first window;

an opening provided in the detection box and configured to allow an object to enter the detection box; and a lid provided in the detection box and configured to detect that the object enters the detection box and to close the opening.

* * * * *